United States Patent
Lilly et al.

(10) Patent No.: US 10,169,927 B2
(45) Date of Patent: Jan. 1, 2019

(54) METHODS AND SYSTEMS FOR MONITORING VEHICLE SYSTEMS USING MOBILE DEVICES

(71) Applicant: HONEYWELL INTERNATIONAL INC., Morristown, NJ (US)

(72) Inventors: David Daniel Lilly, Ramona, CA (US); Charles Kemp, Lake Charles, LA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 233 days.

(21) Appl. No.: 14/465,609

(22) Filed: Aug. 21, 2014

(65) Prior Publication Data

US 2016/0055685 A1    Feb. 25, 2016

(51) Int. Cl.
*G07C 5/00* (2006.01)
*G07C 5/08* (2006.01)
*H04W 84/18* (2009.01)

(52) U.S. Cl.
CPC ........... *G07C 5/008* (2013.01); *G07C 5/0808* (2013.01); *G07C 2205/02* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,239,468 A * | 8/1993 | Sewersky | B64F 5/0045 701/14 |
| 6,055,468 A | 4/2000 | Kaman et al. | |
| 6,219,597 B1 * | 4/2001 | Longere | B64F 5/60 244/1 R |
| 6,842,460 B1 * | 1/2005 | Olkkonen et al. | H04W 48/16 370/328 |
| 7,276,703 B2 | 10/2007 | Berkcan et al. | |
| 7,489,992 B2 | 2/2009 | Valette et al. | |
| 8,200,376 B2 | 6/2012 | Mattingly et al. | |

(Continued)

OTHER PUBLICATIONS

EP Extended Search Report for Application No. EP 15180663.5 dated Jan. 29, 2016.

(Continued)

*Primary Examiner* — Jelani A Smith
*Assistant Examiner* — Paul A Castro
(74) *Attorney, Agent, or Firm* — Lorenz & Kopf, LLP

(57) ABSTRACT

Methods and systems are provided for presenting information pertaining to the health of one or more mechanical components of a vehicle. One exemplary method involves a client device initiating an ad hoc wireless connection with a monitoring system onboard the vehicle, requesting status information for the vehicle from the monitoring system via the ad hoc wireless connection, and receiving the status information for the vehicle from the monitoring system via the ad hoc wireless connection. The monitoring system generates the status information based at least in part on measurement data obtained from one or more sensor systems during operation of the vehicle and provides the status information in response the request. The client device processes the status information present the one or more graphical representations of the current condition of the one or more mechanical components of the vehicle on the client device.

17 Claims, 13 Drawing Sheets

(56) References Cited

U.S. PATENT DOCUMENTS

| | | | |
|---|---|---|---|
| 8,346,411 B1 | 1/2013 | Dirks et al. | |
| 8,618,928 B2 | 12/2013 | Weed et al. | |
| 8,777,800 B2 | 7/2014 | Morel | |
| 9,026,336 B2 | 5/2015 | Ziarno | |
| 9,043,073 B2* | 5/2015 | Ricci | G06F 17/00 340/438 |
| 9,485,605 B2 | 11/2016 | Beran et al. | |
| 9,536,149 B1 | 1/2017 | Cesarano | |
| 2004/0203379 A1* | 10/2004 | Witkowski | H04L 12/66 455/41.2 |
| 2005/0032550 A1* | 2/2005 | Baratono | B60R 1/12 455/558 |
| 2005/0220113 A1* | 10/2005 | Skalecki | H04L 45/10 370/395.2 |
| 2006/0004499 A1* | 1/2006 | Trego | B64D 45/00 701/31.4 |
| 2007/0135977 A1 | 6/2007 | Mindeman | |
| 2008/0036187 A1 | 2/2008 | Breed | |
| 2008/0137590 A1* | 6/2008 | Stott | G07C 5/008 370/328 |
| 2009/0152391 A1 | 6/2009 | McWhirk | |
| 2010/0073197 A1 | 3/2010 | Eagleton et al. | |
| 2011/0066297 A1 | 3/2011 | Saberi et al. | |
| 2011/0098879 A1 | 4/2011 | Basir et al. | |
| 2011/0125419 A1 | 5/2011 | Bechhoefer et al. | |
| 2011/0276218 A1 | 11/2011 | Dwan et al. | |
| 2012/0101776 A1 | 4/2012 | Brower et al. | |
| 2013/0073259 A1 | 3/2013 | Safa-Bakhsh et al. | |
| 2013/0204487 A1* | 8/2013 | Ovens | B64F 5/00 701/33.2 |
| 2013/0232237 A1 | 9/2013 | Zulch, III et al. | |
| 2014/0036686 A1 | 2/2014 | Bommer et al. | |
| 2014/0061382 A1 | 3/2014 | Tucker | |
| 2014/0067244 A1* | 3/2014 | Baker | G06Q 30/02 701/120 |
| 2014/0075356 A1 | 3/2014 | Gray et al. | |
| 2015/0321768 A1 | 11/2015 | Kumar et al. | |
| 2015/0369742 A1 | 12/2015 | Tamada et al. | |
| 2016/0125740 A1* | 5/2016 | Pasko | G08G 5/0034 701/528 |
| 2016/0152321 A1 | 6/2016 | D'Andrea et al. | |
| 2016/0221671 A1 | 8/2016 | Fisher et al. | |

OTHER PUBLICATIONS

Barrera et al.; Structural Health Monitoring Network System with Wireless Communications Inside Closed Aerospace Structures; 6th European Workshop on Structural Health Monitoring—Tu.3,a.3; Corresponding author: Barrera, Instrumentation and Applied Acoustic Research Group. Technical University of Madrid (UPM). Ctra. Valencia, Km. 7. 28031, Madrid, Spain. Eduardo.

Sarnpigethaya et al.; Secure Operation, Control, and Maintenance of Future E-Enabled Airplanes; Proceedings of the IEEE | vol. 96,No. 12, Dec. 2008.

Intelligent Automation, Inc.; IAI awarded $4 million by the Air Force to develop a Damage Registration Tool for High-Performance Aircraft; © 2008-2014 Intelligent Automation, Inc. | 15400 Calhoun Drive, Suite 190, Rockville, MD.

Yi et al.; Wireless Sensor Network for Structural Health Monitoring using System-on-Chip with Android Smartphone; Department of Electrical and Computer Engineering Illinois Institute of Technology, Chicago IL,USA; 978-1-4673-4642-9/13 © 2013 IEEE.

Yedavalli et al.; Application of wireless sensor networks to aircraft control and health management systems; Control Theory Appl 2011 9 (1) 28-33; c South China University of Technology and Academy of Mathematics and Systems Science, CAS and Springer-Verlag Berlin Heidelberg 2011.

Angadi et al.; An Aircraft Health Monitoring System using IOT; Indian Journal of Science and Technology, vol. 9(33), DOI: 10.17485/ijst/2016/v9i33/95625, Sep. 2016.

USPTO Office Action for U.S. Appl. No. 15/614,275 dated Oct. 17, 2018.

* cited by examiner

METHODS AND SYSTEMS FOR MONITORING VEHICLE SYSTEMS USING MOBILE DEVICES

TECHNICAL FIELD

The subject matter described herein relates generally to vehicle systems, and more particularly, embodiments of the subject matter relate to monitoring vehicle systems using mobile electronic devices.

BACKGROUND

Vehicle and aviation communities continually attempt to achieve improved safety and reduced operating costs. Health and Usage Monitoring Systems (HUMS) monitor the drive train and other vehicle and aircraft component's health using specialized measurements and diagnostics. For example, in the case of a helicopter or other rotorcraft, the rotating blades in a blade assembly as well as other mechanical components in the drive train, may be monitored as they experience bending, twisting, imbalances, misalignments, wear and other vibratory forces during flight.

In practice, HUMS data is often obtained from the HUMS via a physical connection and then transferred to a ground station having software configured to process the data and generate graphical displays based on the data that can be reviewed by a user (e.g., a pilot, crew chief, HUMS manager, or the like). However, this process can be time consuming and requires a user have the appropriate hardware (e.g., the necessary cables for connecting to the HUMS and access to a ruggedized portable computer with the necessary software for processing the HUMS data). In remote areas or periods of inclement weather, the process can become a nuisance, particularly in situations where the applicable rules require that an aircraft (or other vehicle) refrain from further operation until the HUMS data has been reviewed and analyzed. Accordingly, it is desirable to enable HUMS data to be reviewed in a more expeditious and convenient manner to improve the efficiency of operations (or reduce operating costs) without compromising safety and while remaining in full compliance with regulatory or operational guidelines.

BRIEF SUMMARY

Methods and systems are provided for presenting information pertaining to the health of one or more mechanical components of a vehicle. One exemplary method involves a client device initiating an ad hoc wireless connection with a monitoring system onboard the vehicle, requesting status information from the monitoring system via the ad hoc wireless connection, and receiving the status information from the monitoring system via the ad hoc wireless connection. The monitoring system generates the status information based at least in part on measurement data obtained during operation of the vehicle and provides the status information in response to the client device requesting the status information. The client device processes the status information to present one or more graphical representations of a condition of the one or more mechanical components of the vehicle on the client device.

In one embodiment, a vehicle system includes one or more sensor systems to obtain measurement data corresponding to operational characteristics of one or more mechanical components of a vehicle and a monitoring system coupled to the one or more sensor systems. The monitoring system determines status data indicative of a current condition of the one or more mechanical components based on the measurement data, establishes an ad hoc wireless connection with a client device using a communications interface, and transmits the status data to the client device via the ad hoc wireless connection. The status data is executable by the client device to present one or more graphical representations of the current condition of the one or more mechanical components of the vehicle that was determined by the monitoring system.

In yet another embodiment, a vehicle health management system includes a monitoring system onboard a vehicle and a client device. The monitoring system obtains measurement data corresponding to operational characteristics of one or more mechanical components of the vehicle, determines status data indicative of a condition of the one or more mechanical components, and establishes an ad hoc wireless network associated with the vehicle. The client device initiates a connection via the ad hoc wireless network, receives the status data from the monitoring system via the connection, and displays one or more graphical representations indicative of the condition of the one or more mechanical components that was determined by the monitoring system based on the status data.

BRIEF DESCRIPTION OF THE DRAWINGS

Embodiments of the subject matter will hereinafter be described in conjunction with the following drawing figures, which are not necessarily drawn to scale, wherein like numerals denote like elements, and.

DETAILED DESCRIPTION

Figure 1:
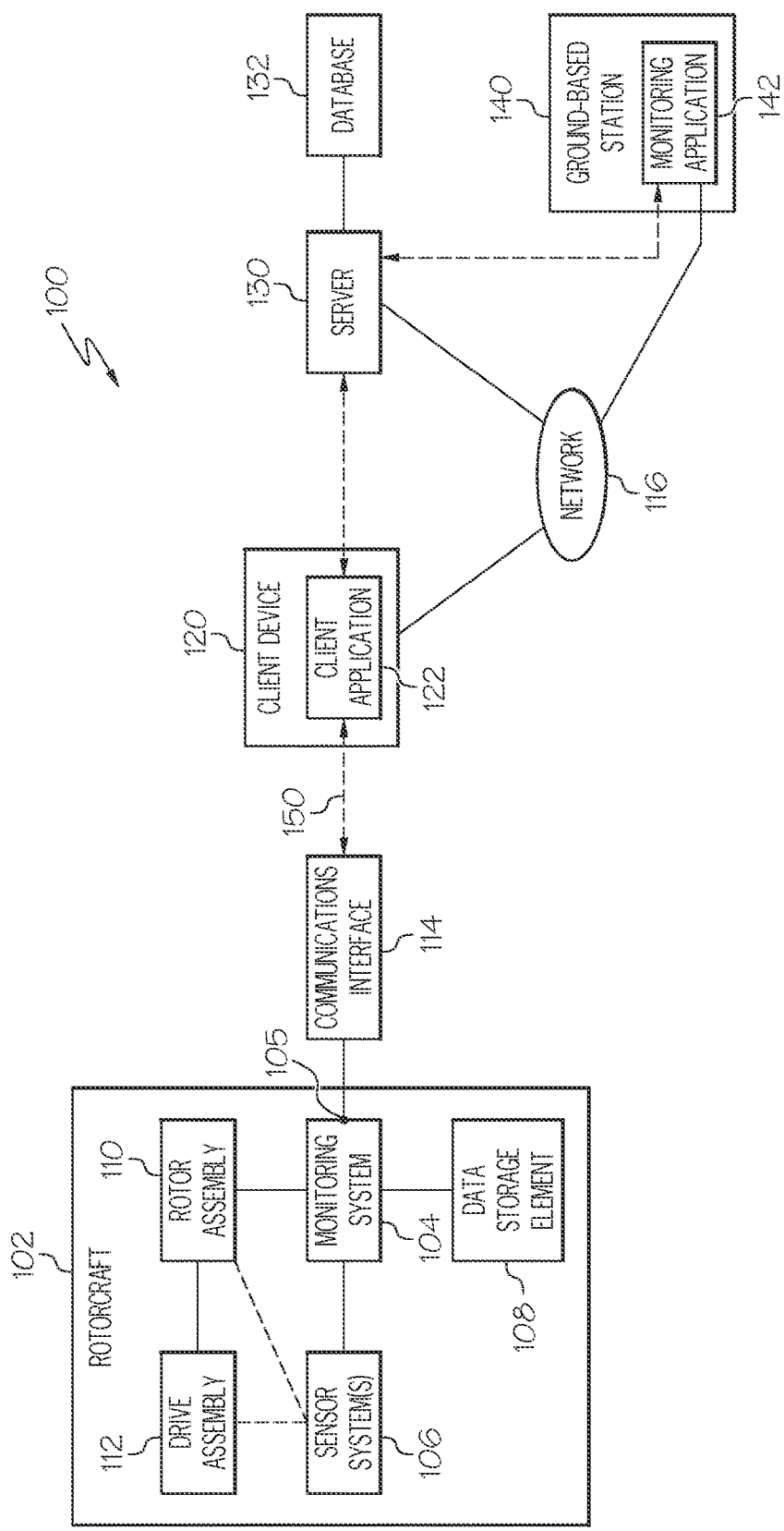
FIG. 1 is a block diagram of a health management system suitable for use with a vehicle such as a rotorcraft in accordance with one or more embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to presenting information pertaining to a relative health or condition of one or more mechanical components of a vehicle in conjunction with an onboard monitoring system, such as a Health and Usage Monitoring Systems (HUMS). As described in greater detail below, during operation of the vehicle, the onboard monitoring system obtains measurement data corresponding or otherwise correlating to operational characteristics of the mechanical components of the vehicle from one or more sensor systems onboard the vehicle. The monitoring system analyzes or otherwise processes the raw measurement data obtained during the operation of the vehicle by applying one or more diagnostic algorithms to the raw measurement data to produce corresponding status data (or status metrics) indicative of the health or condition of the mechanical components of the vehicle. In exemplary embodiments described herein, the monitoring system establishes or otherwise supports an ad hoc wireless network that may be utilized to transfer data from the monitoring system to a client electronic device, such as a mobile phone. In this regard, the client device executes or otherwise implements an application configured to support initiating a point-to-point connection with the monitoring system via the ad hoc wireless network and receiving status information or measurement data from the monitoring system via the ad hoc wireless point-to-point connection. It should be noted that the ad hoc wireless network may be established on an as needed basis, for example, by temporarily plugging in a detachable portable wireless adapter to an appropriate port of the monitoring system or enabling a wireless adapted integrated with the monitoring system for the duration of time required to transfer the data. Additionally, there is no need for or reliance on any network infrastructure that is separate from, external to, or otherwise independent of the ad hoc wireless network supported by the vehicle monitoring system, thereby ensuring the reliability and security of the data transfer.

In exemplary embodiments, the application supports generating graphical user interface (GUI) displays on the client device that includes graphical representations of the health or condition of the mechanical components that was determined by the onboard monitoring system. In one or more embodiments, the monitoring system creates or otherwise generates graphical indications of the health or condition of the mechanical components and provides a file including those graphical indications to the application which may be opened, viewed, or otherwise displayed by the application. In other embodiments, the monitoring system generates executable code or data for generating the graphical representations of the health or condition of the mechanical components that was determined by the onboard monitoring system and provides the code to the client device for execution or integration with the application. Thus, when the code or data is executed by the client device, the graphical representations of the health or condition of the mechanical components that was determined by the onboard monitoring system are presented on the client device. In yet other embodiments, the monitoring system provides the status data to the application on the client device in a particular format, which can be parsed or otherwise processed by the application to present the graphical representations of the health or condition of the mechanical components that was determined by the onboard monitoring system. It will be appreciated that the application configured to support displaying the graphical representations of the health or condition of the mechanical components may be installed on any particular electronic device and does not require aircraft-specific configuration files.

As described in greater detail below, when the health or condition of the mechanical components that was determined by the onboard monitoring system indicates that the vehicle may require maintenance or that the measurement data may otherwise need to be manually reviewed by a particular individual before resuming operation of the vehicle, the client device may be utilized as an intermediary. In this regard, the client device retrieves the measurement data from the onboard monitoring system via the ad hoc wireless point-to-point connection, and then uploads or otherwise retransmits the measurement data to the appropriate destination via another communications network that is separate from or otherwise distinct from the vehicle wireless network. For example, the client device may upload the measurement data to a server via a cellular network, the Internet, or the like. In this regard, the onboard monitoring system may not be communicatively coupled to or may be incapable of communicating on the communications network used by the client device to upload or retransmit the measurement data. It will be appreciated that the client device may utilize any available communications network on which it may communicate with the destination device for uploading the measurement data to the destination device, thereby providing increased versatility or flexibility. In this regard, if a user's cell phone is being used to upload the measurement data via a wireless local area network, and the user moves to a location outside the range of the wireless local area network, the application on the user's cell phone may continue uploading the measurement data via a cellular network.

FIG. 1 depicts an exemplary embodiment of a health management system 100 for monitoring the condition or health of one of more mechanical components of a vehicle 102 using an electronic device 120 communicatively coupled to a monitoring system 104 onboard the vehicle 102. For purposes of explanation, the subject matter may be described herein in the context of monitoring the condition of one or more blades, wings or other airfoils or the corresponding drive train components of a helicopter or other rotorcraft. In this regard, the rotorcraft 102 may include at least one rotor assembly 110 having a plurality of blades that rotate in conjunction with a rotor driven by a drive train assembly 112. That said, the subject matter described herein is not intended to be limited to rotorcraft or any particular type of mechanical component, and in practical embodiments, may be implemented in an equivalent manner for other types of mechanical components of other types of aircraft or ground vehicles. Furthermore, it should be appreciated that FIG. 1 depicts a simplified representation of the vehicle health management system 100 for purposes of explanation, and FIG. 1 is not intended to limit the subject matter in any way.

In exemplary embodiments, the rotorcraft 102 includes an onboard monitoring system 104 that is coupled to one or more onboard sensor systems 106 that are configured to sense, measure, detect, or otherwise quantify one or more characteristics (or conditions) of one or more mechanical components of the rotorcraft 102 during operation of the rotorcraft 102. In some embodiments, an onboard sensor system 106 may sense, measure, detect, or otherwise quantify a characteristic that correspond to an operational characteristic (or condition) of one or more mechanical components of the rotorcraft 102 during operation of the rotorcraft 102. For example, a sensor system 106 onboard the rotorcraft 102 may include one or more accelerometers, velometers (velocity sensors), proximity probes, tachometers, MEMS vibration sensors, or the like configured to quantify the rate or frequency at which the body, frame, seats, or other mechanical component of rotorcraft 102 vibrates or otherwise oscillates during flight. One or more onboard sensor systems 106 may also be coupled to or otherwise configured to measure operational, mechanical and/or performance characteristics of the engine(s), gearbox(es), transmission(s) or other mechanical components of the drive assembly 112 that are mechanically coupled to the rotor assembly 110 to rotate the rotor or blades of the rotor assembly 110 during flight. Additionally, one or more onboard sensor systems 106 may be configured to measure or otherwise quantify the speed of rotation of the respective blades or the rotor, the deflection or angle attack of the respective blades, the imbalance of rotors or shafts, the misalignment or excessive wear of shafts, gears and/or bearings, or other characteristics of the drive train assembly 110 during flight. For purposes of explanation, "raw measurement data," "raw operational data," "raw flight data," or variants thereof may be used herein to refer to the unprocessed measurement data obtained via the onboard sensor system(s) 106 that corresponds to the characteristic(s) of the mechanical component(s) of the rotor assembly 110, the drive assembly 112 or other mechanical component(s) of the rotorcraft 102 that were measured during operation of the rotorcraft 102.

The monitoring system 104 generally represents the combination of hardware, firmware and/or other components onboard the rotorcraft 102 that is coupled to the onboard sensor system(s) 106 to receive raw measurement data pertaining to the operational characteristics of the rotor assembly 110, the drive assembly 112 and other mechanical components of the rotorcraft 102. In one or more embodiments, the monitoring system 104 modifies or otherwise adjusts the rotor assembly 110 in a manner that is influenced by the measurement data from the sensor system(s) 106 (e.g., rotor track and balance adjustments) to reduce vibrations of the rotorcraft 102 or otherwise mitigate wear and tear or other undesirable physical effects on the mechanical components of the rotorcraft 102.

In exemplary embodiments, the monitoring system 104 includes any number of processing devices, hardware, logic circuitry, or combinations thereof configured to process or analyze the raw measurement data and generate corresponding status summary data for the respective mechanical components of the rotorcraft 102, as described in greater detail below. In this regard, the monitoring system 104 may include one or more processors, central processing units (CPUs), controllers, microprocessors, microcontrollers, processing cores and/or other computing resources configured to support the subject matter described herein. The monitoring system 104 may include or otherwise access one or more data storage element(s) 108 (or memory(s)) capable of storing the raw measurement data, the status summary data, and programming instructions for execution by the monitoring system 104. For example, the data storage element 108 may be realized as one or more of a random access memory (RAM), a read only memory (ROM), a flash memory, a magnetic or optical mass storage, or any other suitable configuration of non-transitory short or long term data storage or other non-transitory computer-readable media. The stored programming instructions, when read and executed by the monitoring system 104, cause the monitoring system 104 to generate the status summary data for the respective mechanical components of the rotorcraft 102 and perform various additional tasks, functions, processes and/or operations described in greater detail below.

In exemplary embodiments, the monitoring system 104 is coupled to a communications interface 114 and cooperatively configured to support establishing an ad hoc wireless network associated with the rotorcraft 102 via the communications interface 114. In one or more embodiments, the monitoring system 104 is housed within a housing or body having one or more interfaces 105 (e.g., ports, terminals, or the like) for receiving a communications interface 114 that may be inserted therein. For example, in one or more embodiments, the communications interface 114 is realized as a wireless adapter that supports communications over a wireless local area network (WLAN) that may be inserted into a port 105 provided on the housing of the monitoring system 104. In this regard, the communications interface 114 may operate in accordance with one or more of the IEEE 802.11 standards and support the transmission control protocol/internet protocol (TCP/IP) or other conventional communications protocols. In alternative embodiments, the communications interface 114 may be realized as a Bluetooth transceiver, a wireless transceiver, a wireless network interface controller, or the like, and in some embodiments, the communications interface 114 may be integrated with the monitoring system 104 or otherwise contained within its housing. That said, in exemplary embodiments described herein, the communications interface 114 is realized as a separate and detachable wireless adapter or other hardware, firmware, circuitry or components configured to support establishing an ad hoc wireless network that is inserted into a port 105 of the monitoring system 104 on an as-needed basis, as described in greater detail below.

Still referring to FIG. 1, in exemplary embodiments, when it is desirable to review or obtain measurement data pertaining to the status of the mechanical components of the rotorcraft 102, a user inserts the communications interface 114 into the port 105 of the monitoring system 104, which in turn, results in the monitoring system 104 automatically establishing an ad hoc wireless network associated with the rotorcraft 102 via the communications interface 114. For example, in one embodiment, the monitoring system 104 broadcasts a service set identifier (SSID) corresponding to a unique identifier associated with the rotorcraft 102, such as, for example, its tail number. Thereafter, the user manipulates an application 122 executing on a portable electronic device 120 (or client device) that is within range of the wireless network to connect to the ad hoc wireless network associated with the rotorcraft 102 and request data from the monitoring system 104, as described in greater detail below.

The client device 120 may be realized as any sort of mobile electronic device capable of wirelessly communicating data, such as, for example, a mobile telephone, a laptop or notebook computer, a tablet computer, a desktop computer, a personal digital assistant, or the like. In exemplary embodiments, the client device 120 is communicatively coupled to a communications network 116 that is separate and distinct from the ad hoc wireless network associated with the rotorcraft 102, and furthermore, in some embodiments, the monitoring system 104 or the rotorcraft 102 may be incapable of communicating over the network 116. In the embodiment of FIG. 1, the network 116 is any communications network (or a combination of communications networks) capable of transmitting data between the client device 120 and a server 130. In various embodiments, network 116 includes any number of public or private data connections, links or networks supporting any number of communications protocols. Network 116 may include the Internet, for example, or any other network. In various embodiments, network 116 may also incorporate a wireless and/or wired telephone network, such as a cellular communications network for communicating with mobile phones, personal digital assistants, and/or the like. Various embodiments of network 116 may also incorporate any sort of wireless or wired local area networks (LANs), wide area networks (WAN), or the like.

In exemplary embodiments, the client device 120 includes a processing system that includes or is otherwise coupled to a data storage element having programming instructions or code that, when read and executed, cause the processing system to generate or otherwise facilitate the client application 122 on the client device 120. In one or more embodiments, the client application 122 is a standalone application that runs on the client device 120, with the code or programming instructions corresponding to the client application 122 being downloaded or retrieved via a network 116 (e.g., from the server 130 or another networked host). In other embodiments, the code or programming instructions corresponding to the client application 122 may be retrieved on an as-needed basis at run-time (e.g., from the server 130 via network 116 or from the monitoring system 104). As described in greater detail below, the client application 122 generates or otherwise provides one or more graphical user interface (GUI) displays on a display device associated with the client device 120 (e.g., the display of the client device 120) that include GUI elements adapted to allow the user of the client device 120 to initiate a connection to the monitoring system 104, request data from the monitoring system 104 via that connection, and transmit data from the monitoring system 104 to the server 130 via the network 116.

In the illustrated embodiment of FIG. 1, the server 130 may be realized as one or more server computers or other device(s) coupled to the network 116. The server 130 may be implemented with a server computer system or data processing system that is based upon any processor, architecture and/or operating system, and will typically be implemented using any sort of processing system, memory and input/output features. Various embodiments may be implemented using dedicated or shared hardware servers; other implementations may make use of virtual server features as part of a "cloud computing" service. Although FIG. 1 shows a single server 130 for convenience, many practical embodiments of the vehicle health management system 100 may provide a cluster or other collection of multiple host servers 130 to support any desired number of features or functionality in the vehicle health management system 100. In one or more embodiments, the server 130 (or the processing system thereof) executes programming instructions that perform various tasks, functions, processes and/or operations described in greater detail below. In the illustrated embodiment, the server 130 is communicatively coupled to a database 132 for storing or otherwise maintaining measurement data associated with various instances of rotorcraft 102 that is received by the server 130 from the monitoring system 104 of the respective instance of rotorcraft 102 via a client device 120 and the network 116, as described in greater detail below.

The ground-based station 140 generally represents another electronic device in the vehicle health management system 100 that may be communicatively coupled to the network 116 to receive, via the network 116, measurement data pertaining to the rotorcraft 102 from the server 130. The ground-based station 140 may also generate or otherwise execute a monitoring application 142 that generates or otherwise provides one or more GUI displays on a display device associated with the ground-based station 140 that allow the user review measurement data received from the server 130 via the network 116, as described in greater detail below. In this regard, the ground-based station 140 may maintain or otherwise access aircraft-specific configuration files used to update or otherwise synchronize the monitoring application 142 with the operating system and/or file structure implemented by the monitoring system 104. Thus, the monitoring application 142 may support multiple different types of vehicles by referencing the appropriate configuration file. The aircraft-specific configuration files allow the monitoring application 142 to be capable of parsing or otherwise processing the detailed flight log data generated by the monitoring system 104 with a particular aircraft-specific format or structure, storing and analyzing multiple instances of flight log data to discern trends in the operational characteristics or health of the mechanical components of the rotorcraft 102, and generating GUI displays that present the results of the analysis and/or allow a user at the ground-based station 140 to perform a detailed review the measurement data encapsulated by the flight log data. In contrast, the client application 122 may not have access the aircraft-specific configuration files, historical flight data or trend data, or the capability to present GUI displays based on the flight log data.

Figure 2:
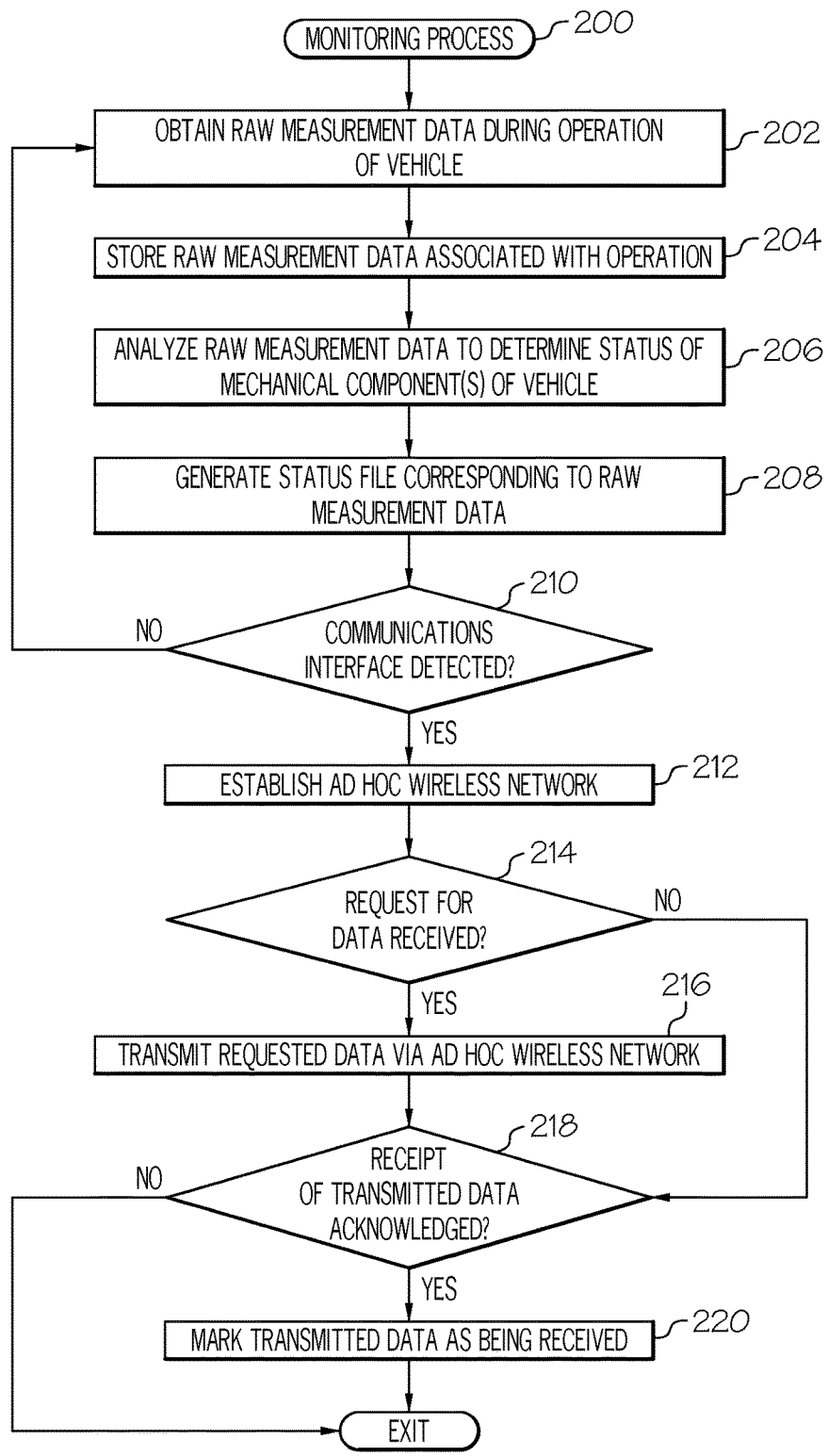
FIG. 2 is a flow diagram of an exemplary monitoring process suitable for implementation by a monitoring system onboard the vehicle in the system of FIG. 1 in accordance with one or more embodiments.

FIG. 2 depicts an exemplary embodiment of a monitoring process 200 suitable for implementation by a monitoring system onboard a vehicle, such as the monitoring system 104 onboard the rotorcraft 102 in FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the monitoring process 200 may be performed by different elements of the vehicle health management system 100, such as, for example, the monitoring system 104, the sensor system(s) 106, the data storage element 108, and/or the communications interface 114. It should be appreciated that the monitoring process 200 may include any number of additional or alternative tasks, the tasks need not be performed in the illustrated order and/or the tasks may be performed concurrently, and/or the monitoring process 200 may be incorporated into a more comprehensive procedure or process having additional functionality not described in detail herein. Moreover, one or more of the tasks shown and described in the context of FIG. 2 could be omitted from a practical embodiment of the monitoring process 200 as long as the intended overall functionality remains intact.

The illustrated monitoring process 200 begins by obtaining raw measurement data pertaining to mechanical component(s) of the vehicle during operation of the vehicle, and storing the raw measurement data associated with that instance of operation (tasks 202, 204). For example, the monitoring system 104 onboard the rotorcraft 102 may obtain raw measurement data from the onboard sensor system(s) 106 pertaining to operational characteristics of the rotor assembly 110 and drive assembly 112 while the rotorcraft 102 is in flight. The monitoring system 104 creates or otherwise instantiates a flight log data structure in the data storage element 108 associated with each particular flight and stores or otherwise maintains the raw measurement data obtained during that flight using the flight log data structure. In this regard, each different type of measurement data captured by a particular sensor system 106 during an instance of operation of the rotorcraft 102 may be encapsulated in a measurement data file with a particular format (e.g., having an associated file extension that identifies the type of measurement data contained therein), with the flight log data structure maintaining the association among the measurement data files corresponding to that instance of operation. For example, the flight log data structure may be realized as a directory (or file folder) created in the data storage element 108 by the monitoring system 104, with the name or identifier associated with the directory corresponding to the instance of operation (e.g., the date and time of the flight) and the contents of the directory consisting of the measurement data files for that instance of operation. In other embodiments, the flight log data structure may be realized as a flight log file that encapsulates the collection of measurement data associated with a particular instance of operation. As used herein, flight log data should be understood as referring to a flight log file, a flight log data structure, or any other suitable logical collection of measurement data associated with a particular instance of operation that are maintained in the data storage element 108.

In exemplary embodiments, after an instance of operation of the vehicle is completed, the monitoring process 200 continues by analyzing or otherwise processing the raw measurement data corresponding to that instance of operation to identify or otherwise determine the status of the mechanical component(s) of the vehicle based on their observed operational characteristic(s) during the most recent operation (task 206). In this regard, for a respective mechanical component of the vehicle, the monitoring process 200 calculates or otherwise determines a metric representative of the relative health of that mechanical component based on the raw measurement data corresponding to the operational characteristics of that mechanical component using one or more diagnostic algorithms.

For example, the monitoring system 104 may obtain raw voltage measurement data samples from a measurement data file corresponding to an onboard vibrational sensor 106 (e.g., where the voltage measurements are proportional to the vibration or physical excitation of the vibrational sensing sensor), perform a time-synchronous resample proportional to the rotation of a gear in the drive assembly 112, provide the resampled measurement data to a gear health algorithm that outputs a metric indicative of the health of the gear (or gearbox), compare the metric to one or more applicable thresholds to ascertain the current condition of the gear (or gearbox), and then update the current health status of the gear (or gearbox) accordingly. As another example, the monitoring system 104 may obtain raw voltage measurement data samples from the measurement data file corresponding to the onboard vibrational sensor 106, perform a fast Fourier transform on the raw measurement data samples, detecting a peak frequency (e.g., using a peak picker tool or the like) around the speed of an engine turbine of the drive assembly 112, compare the detected frequency to one or more applicable thresholds to ascertain the current condition of the engine, and then update the current health status of the engine accordingly. In yet another embodiment, the monitoring system 104 may obtain raw voltage measurement data samples from a measurement data file corresponding to the onboard vibrational sensor 106 for a particular number of revolutions of a main rotor of the rotor assembly 110, perform a digital filter transformation to obtain the amplitude and phase of the fundamental vibration of the main rotor, provide the amplitude and phase to a rotor health algorithm that outputs a metric indicative of the health of the rotor, compare the metric to one or more applicable thresholds to ascertain the current condition of the rotor, and then update the current health status of the main rotor of the rotor assembly 110 accordingly.

After analyzing the raw measurement data, in exemplary embodiments, the monitoring process 200 continues by creating or otherwise generating a status file indicative of the relative health of the mechanical component(s) of the vehicle for that instance of operation of the vehicle based on the corresponding raw measurement data (task 208). In a similar manner as described above, the monitoring system 104 creates or otherwise instantiates a status summary file in the data storage element 108 associated with the particular flight. For each respective mechanical component being monitored, the monitoring system 104 may classify or categorize the health of that mechanical component based on the metric indicative of its relative health and update or otherwise modify the status summary file to indicate the health of that mechanical component. In some embodiments, the monitoring system 104 indicates the health of an individual mechanical component by generating code or other executable instructions or data stored in the status summary file. The code or instructions, when subsequently obtained and executed by the client device 120, cause the client device 120 to display a graphical indication of the relative health of the particular mechanical component with a visually distinguishable characteristic that indicates the relative health of the component. For example, a green-colored indicator may be utilized to indicate a healthy status, a red-colored indicator may be utilized to indicate an unhealthy status that requires maintenance, a yellow-colored indicator may be utilized to indicate a questionable health status that may need attention, and so on.

For example, if the metric indicative of the health of a gearbox in the drive assembly 112 is above a first threshold value, the monitoring system 104 may identify the gearbox as being healthy and update the status summary file to indicate the gearbox is healthy. In embodiments where the monitoring system 104 generates executable code indicating the gearbox is healthy and stores the code in the status summary file, the client device 120 may subsequently execute the code to display a green-colored indicator for the health of the gearbox. Conversely, if the metric indicative of the health of a gearbox in the drive assembly 112 is above a second threshold value, the monitoring system 104 may identify the gearbox as being elevated and update the status summary file to indicate the gearbox is unhealthy. In this regard, the code stored in the status summary file may cause the client device 120 to display a yellow-colored indicator for the health of the gearbox to indicate an unhealthy status. When the metric indicative of the health of a gearbox in the drive assembly 112 is greater than the first threshold value and greater than the second threshold value, the monitoring system 104 may identify the gearbox as potentially approaching an unhealthy status and update the status summary file to provide a red-colored indicator, thereby indicating the gearbox may need attention or that its continued operation should be evaluated (e.g., to verify compliance with applicable regulatory and/or operations guidelines). It should be appreciated there are numerous ways to classify or categorize the relative health of a particular mechanical component, and the subject matter described herein is not intended to be limited to any particular classification scheme. It should be noted that in some embodiments, when creating the status summary file, the monitoring system 104 may also update the flight log data to include the determined status for the various mechanical components of the rotorcraft 102 (e.g., by creating individual status files within the directory for a particular instance of operation).

In exemplary embodiments, the monitoring process 200 continues by detecting or otherwise identifying a communications interface and establishing an ad hoc wireless network associated with the vehicle in response to detecting the communications interface (tasks 210, 212). In this regard, in the case of a detachable external communications interface 114, the monitoring system 104 detects or otherwise identifies when the communications interface 114 is inserted into the corresponding port 105 associated with the monitoring system 104 by a user. In response to detecting the communications interface 114, the monitoring system 104 automatically operates the communications interface 114 to provide an ad hoc wireless network associated with the rotorcraft 102. For example, in one embodiment, the monitoring system 104 configures the communications interface 114 to implement a wireless local area network in accordance with one or more of the IEEE 802.11 standards having a broadcasted SSID that corresponds to the tail number or another unique identifier associated with the rotorcraft 102. The ad hoc wireless network established by the monitoring system 104 is distinct or otherwise separate from the communications network 116. In practice, the monitoring system 104 and/or the communications interface 114 may be configured to implement encryption, data compression, and/or any other security or communications protocols, as desired.

The illustrated process 200 continues by receiving or otherwise identifying a request for monitoring data from a client device via the ad hoc wireless network and transmitting or otherwise providing the requested monitoring data to the requesting client device via the ad hoc wireless network (tasks 214, 216). As described in greater detail below, a user of the client device 120 may manipulate the client application 122 to request a status summary file or flight log data from the monitoring system 104. In response to receiving a request for one or more of the status summary file(s) or the flight log data, the monitoring system 104 automatically obtains the requested file(s) from the data storage element 108 and transmits or otherwise provides the file(s) to the requesting client device 120 via the communications interface 114 and the ad hoc wireless network. In this manner, the summary status data or raw measurement data may be wirelessly communicated from the monitoring system 104 to the client device 120.

In exemplary embodiments, the monitoring process 200 continues by identifying or otherwise determining whether an acknowledgment corresponding to a transmitted file has been received and in response to receiving such an acknowledgment, marking the transmitted file as having been successfully received (tasks 218, 220). For example, each flight log data structure in the data storage element 108 may be associated with a bit or other indicator of whether or not that flight log data structure has been transmitted to the server 130. Upon creation of an instance of flight log data, the monitoring system 104 may set its associated bit or indicator to indicate that the flight log data structure is "new" or otherwise has not been uploaded to the server 130. In response to receiving a request for one or more flight log data structures, the monitoring system 104 obtains the flight log data structure(s) from the data storage element 108 and transmits the flight log data structure(s) to the client device 120, which, in turn, may retransmit the flight log data structure(s) to the server 130 via the network 116. As described in greater detail below, in some embodiments, in response to receiving and storing a flight log data in the database 132, the server 130 may transmit or otherwise provide an acknowledgment message to the client device 120 via the network 116, which is transmitted or otherwise provided by the client device 120 to the monitoring system 104 via the ad hoc wireless network. In response to receiving the acknowledgment message, the monitoring system 104 updates or otherwise modifies the bit or indicator associated with a transmitted flight log data structure to mark the flight log data structure as having been received by or uploaded to the server 130. In this manner, the monitoring system 104 may track which flight log data structures have been received by the server 130, such that only instances of flight log data that have not yet been received by the server 130 are uploaded to the server 130 in response to subsequent requests to upload all of the most recent flight measurement data to the server 130, as described in greater detail below.

Figure 3:
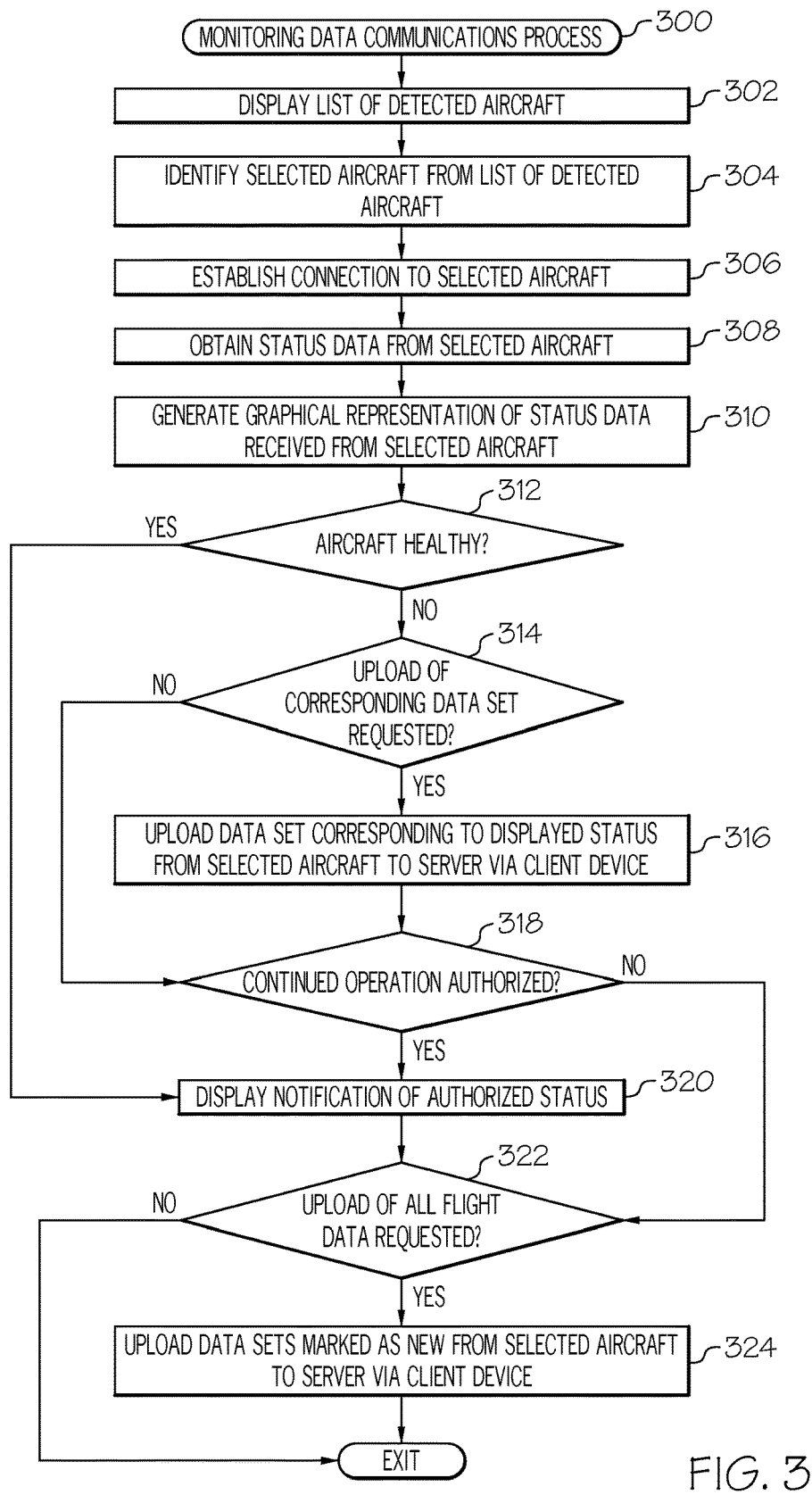
FIG. 3 is a flow diagram of an exemplary data communications process suitable for implementation by a client device in the system of FIG. 1 in conjunction with the monitoring process of FIG. 2 in accordance with one or more embodiments.

FIG. 3 depicts an exemplary embodiment of a monitoring data communications process 300 suitable for implementation by an intermediary electronic device, such as the client device 120 in the vehicle health management system 100 of FIG. 1, to review and transmit monitoring data from a monitoring system onboard a vehicle. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the data communications process 300 may be performed by different elements of the vehicle health management system 100, such as, for example, the monitoring system 104, the communications interface 114, the client device 120, the client application 122, the server 130 and/or the network 116. It should be appreciated that the data communications process 300 may include any number of additional or alternative tasks, the tasks need not be performed in the illustrated order and/or the tasks may be performed concurrently, and/or the data communications process 300 may be incorporated into a more comprehensive procedure or process having additional functionality not described in detail herein. Moreover, one or more of the tasks shown and described in the context of FIG. 3 could be omitted from a practical embodiment of the data communications process 300 as long as the intended overall functionality remains intact.

Referring to FIG. 3 and with continued reference to FIG. 1, in exemplary embodiments, the data communications process 300 begins by displaying or otherwise graphically presenting a list of vehicle ad hoc wireless networks that are detected within a vicinity of (or within range of) the client device (task 302). In this regard, after a user manipulates the client device 120 to open, run, or otherwise execute the client application 122, the client application 122 may be configured to operate a communications interface of the client device 120 to scan for wireless networks detected within communications range of the client device 120. The client application 122 then generates or otherwise provides a menu or listing of the detected wireless networks that are associated with vehicles in the vicinity of the client device 120. For example, the client application 122 may be provisioned with the various tail numbers or other unique identifiers associated with the different vehicles within a particular fleet of vehicles for which the user of the client device 120 may have access to. When the client application 122 detects a wireless network broadcasting an SSID that matches a tail number or other unique vehicle identifier, the client application 122 displays that tail number or vehicle identifier on the client device 120 within a list of detected vehicles.

The data communications process 300 continues by identifying a selection or indication of a particular vehicle from among the list of detected vehicles and automatically initiating or otherwise establishing a connection to the selected vehicle via the ad hoc wireless network associated with the selected vehicle (tasks, 304, 306). In this regard, in response to the user of the client device 120 manipulating the client application 122 to select rotorcraft 102 from a list of detected vehicles, the client application 122 automatically initiates a point-to-point connection to the monitoring system 104 via the ad hoc wireless network associated with the rotorcraft 102 that was established by the monitoring system 104.

Figure 4:
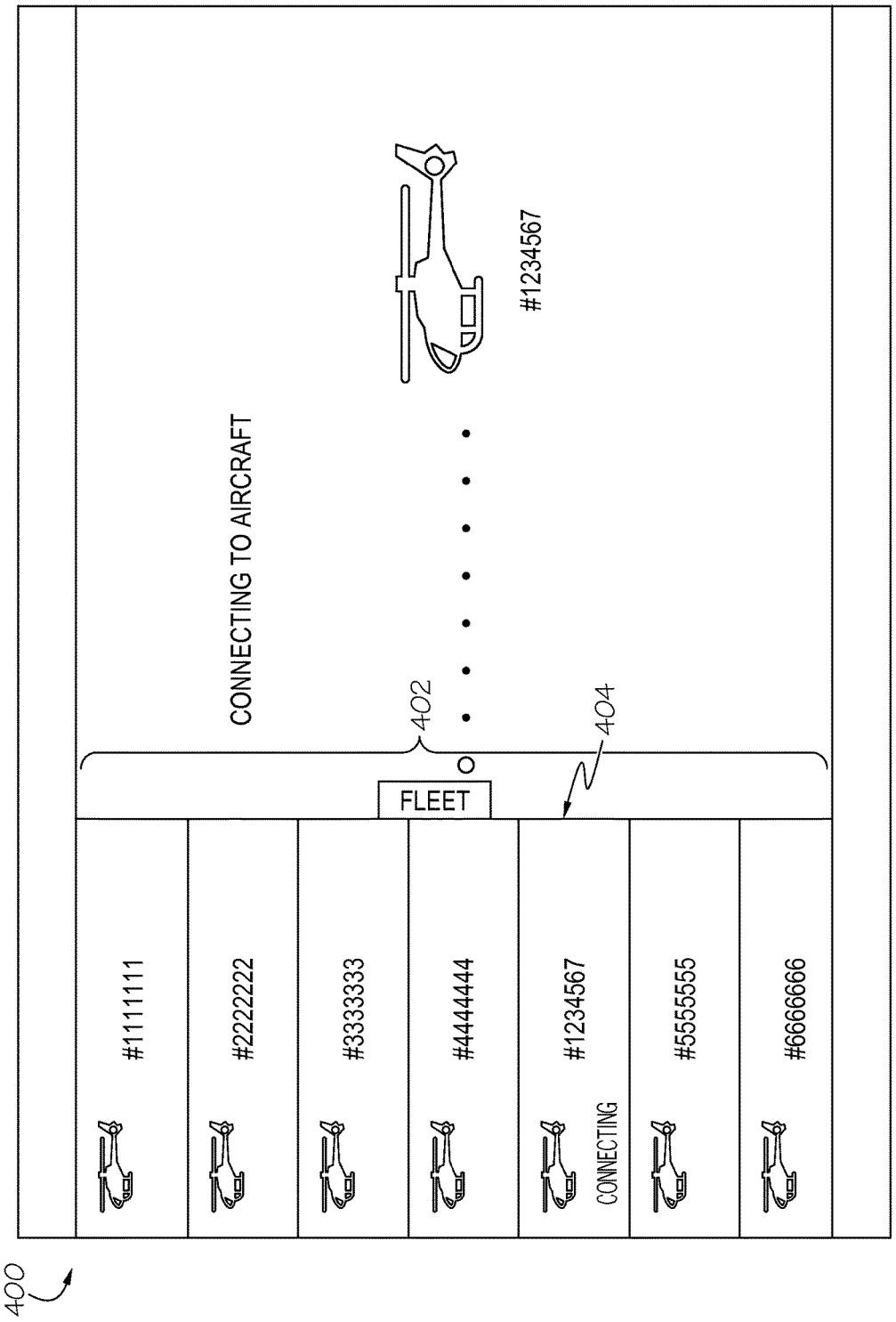
FIGS. 4-10 depict a sequence of graphical user interface displays that may be presented on a client device in conjunction with the data communications process of FIG. 3 in accordance with one exemplary embodiment.
Figure 5:
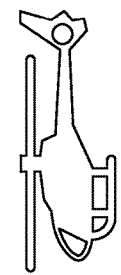

FIGS. 4-5 depict an exemplary sequence of GUI displays 400, 500 that may be presented by the client application 122 on the display of the client device 120 in accordance with one or more exemplary embodiments of the data communications process 300. In this regard, the display 400 of FIG. 4 depicts a GUI element 402 (e.g., a menu, a listbox, or the like) that includes a list of the vehicles detected by the client application 122. For each detected vehicle, the menu 402 includes a selectable GUI element (e.g., a hyperlink, a button, or the like) corresponding to that respective vehicle that may be selected by the user to establish a wireless connection to that respective vehicle. In response to the user selecting the GUI element 404 corresponding to rotorcraft 102, the client application 122 automatically establishes a point-to-point ad hoc wireless connection 150 to the monitoring system 104 and obtains, from the monitoring system 104, information about the status summary file for the most recent operation of the rotorcraft 102. Thereafter, the client application 122 updates the display of the client device 120 to the vehicle monitoring display 500 of FIG. 5.

The vehicle monitoring display 500 includes an informational region 510 including the obtained information about the status summary file (e.g., the file name, the file size, and the like). In exemplary embodiments, the informational region 510 includes a selectable GUI element 502 (e.g., a button or the like) that may be manipulated by a user of the client device 120 to request the status summary file from the monitoring system 104. The illustrated vehicle monitoring display 500 also includes a status region 512 having status indicators corresponding to the various mechanical components of the rotorcraft 102 that are being monitored by the monitoring system 104. In exemplary embodiments, the vehicle monitoring display 500 also includes a summary region 514 that summarizes the overall health status of the rotorcraft 102 based on the classification or categorization of the health of the individual mechanical components.

Referring again to FIG. 3, in exemplary embodiments, the data communications process 300 continues by receiving or otherwise obtaining status information for the mechanical components of the selected vehicle and generating or otherwise providing a graphical representation of the status information (tasks 308, 310). In this regard, in response to the user manipulating button 502, the client application 122 generates a request for the most recent status summary file for the rotorcraft 102 and transmits or otherwise provides the request to the monitoring system 104 via the ad hoc point-to-point wireless connection 150. As described above in the context of FIG. 2, in response to receiving the request, the monitoring system 104 automatically obtains the most recent status summary file from the data storage element 108 and transmits the status summary file to the client device 120 via the ad hoc point-to-point wireless connection 150. In response to receiving the requested status summary file, the client application 122 processes or otherwise executes the code, data or instructions contained therein to update the regions 512, 514 of the display 500 to provide graphical indications of the health or status of the mechanical components of the rotorcraft 102.

Figure 6:
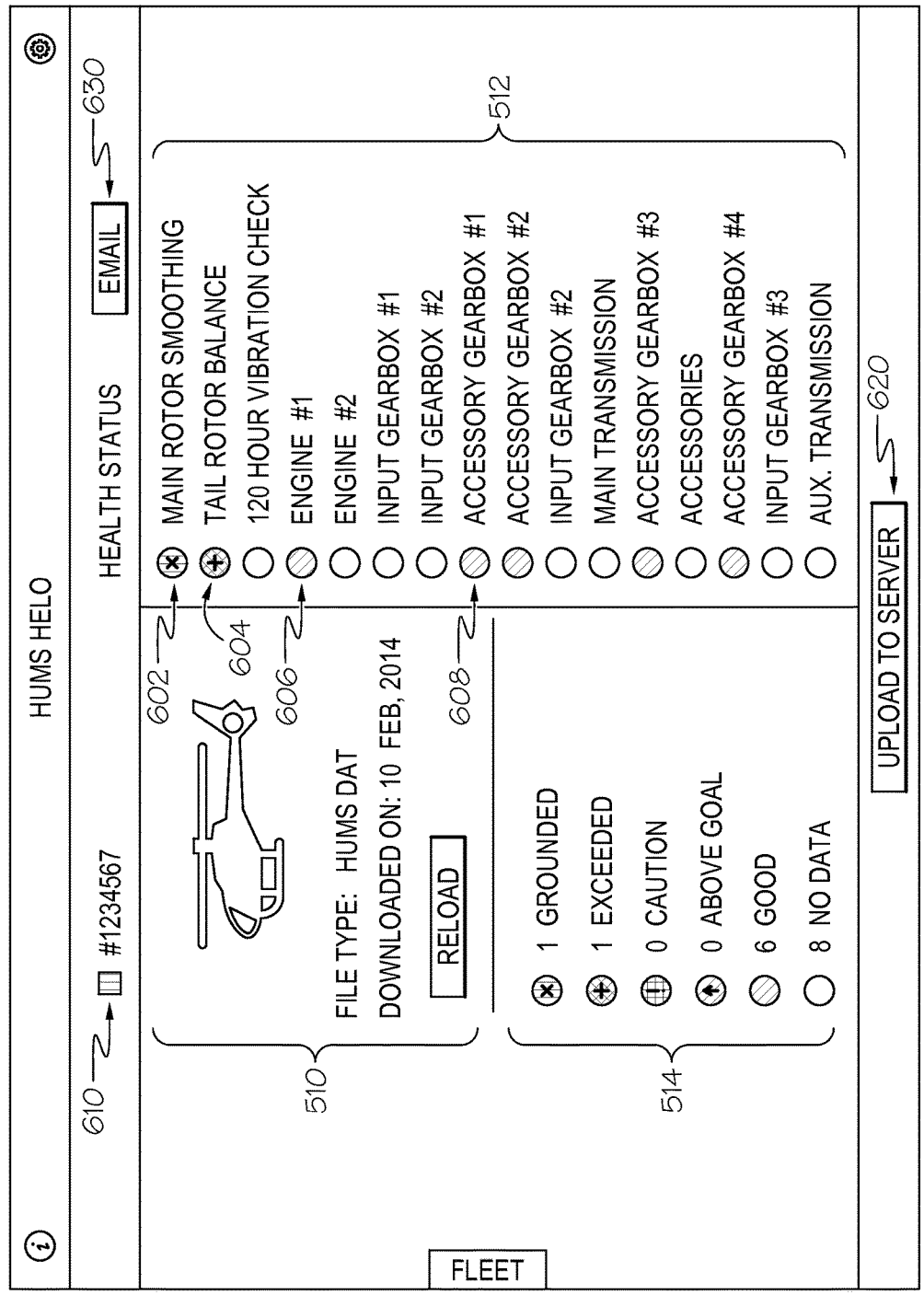
Figure 7:
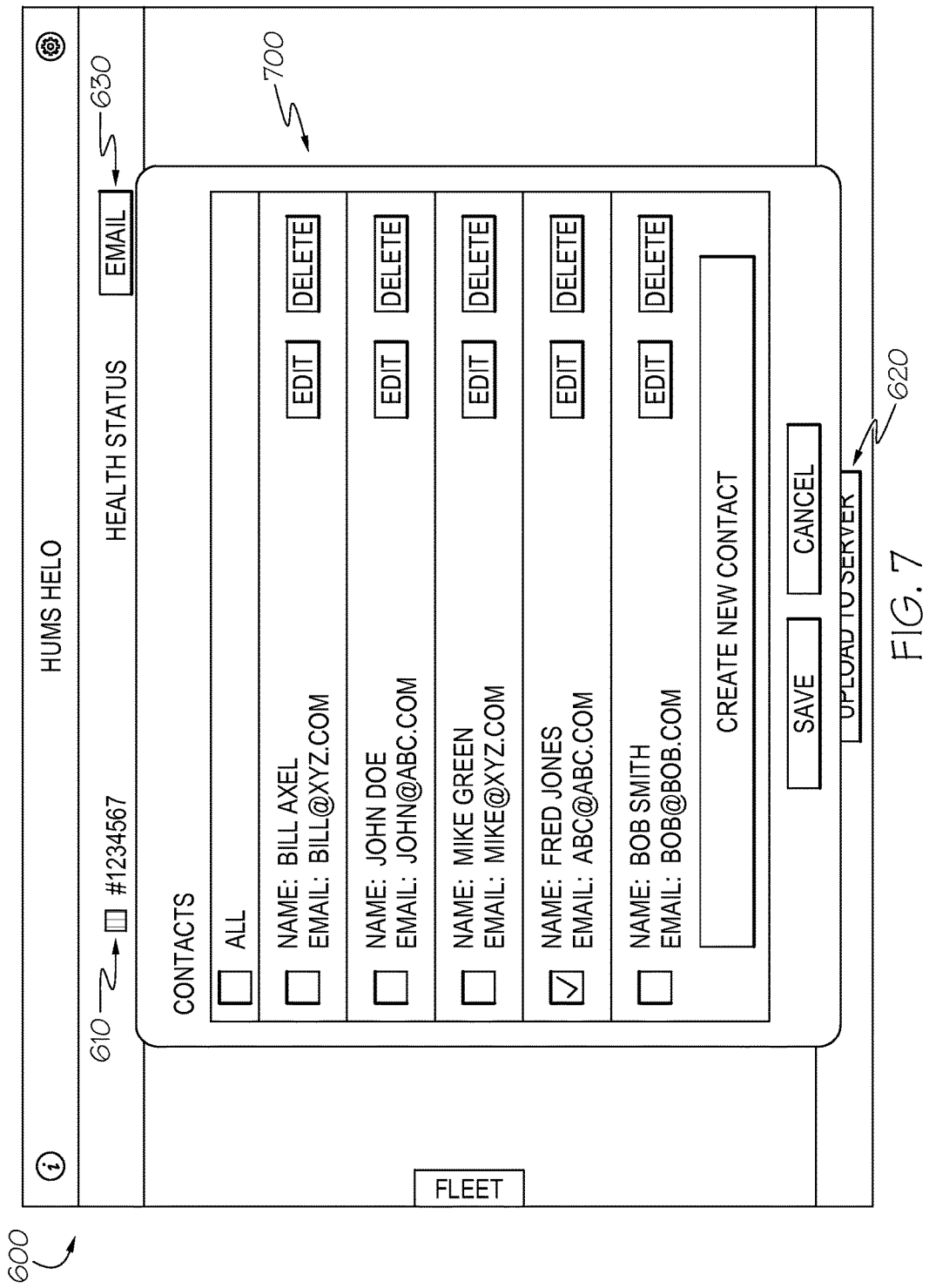

FIG. 6 depicts an updated vehicle monitoring display 600 after the client application 122 processes or otherwise executes the status summary file received from the monitoring system 104 to update the regions 512, 514 and provide graphical indications of the current health or status of the mechanical components of the rotorcraft 102 based on the raw flight measurement data obtained for the most recent flight of the rotorcraft 102. For example, the client application 122 may update the status region 512 by displaying a graphical indicator 602 for a condition of a first rotor assembly 110 (e.g., the main rotor assembly) using a visually distinguishable characteristic (e.g., a red color) that indicates the first rotor assembly 110 is unhealthy, problematic, or otherwise requires attention. Similarly, the client application 122 may display a graphical indicator 604 for a condition of a second rotor assembly 110 (e.g., the tail rotor assembly) using a different visually distinguishable characteristic (e.g., an orange color) that indicates the condition has exceeded an applicable threshold value, display additional graphical indicators 606, 608 for components of the drive assembly 112 using another different visually distinguishable characteristic (e.g., a green color) that indicates those components are healthy or do not require maintenance, and so on. The client application 122 may maintain indicators in a neutral or unmodified displayed state for components where the raw measurement data is lacking or the monitoring system 104 was unable to determine a status. Additionally, the client application 122 may also update the summary region 514 to display the number of mechanical components (or conditions thereof) that are classified or categorized into each of the different potential health statuses. In the illustrated embodiment, when the status of at least one component indicates further attention or maintenance is required, the client application 122 also updates a graphical indicator 610 corresponding to the selected rotorcraft 102 to indicate that the rotorcraft 102 is not cleared for further operation based on the current status data.

Referring again to FIG. 3, in the illustrated embodiment, the data communications process 300 continues by identifying or otherwise determining whether the status data indicates the mechanical components of the vehicle are healthy and that the vehicle is cleared for further operation (task 312). When the mechanical components of the vehicle are healthy and the vehicle is cleared for further operation, the data communications process 300 displays or otherwise provides a graphical notification on the client device (task 320), as described in greater detail below. Conversely, in exemplary embodiments, when the vehicle is not cleared for further operation, the data communications process 300 continues by identifying or otherwise determining whether a request to upload the raw measurement data corresponding to the status data has been received, and in response to receiving a request, uploading or otherwise transferring the set of raw measurement data from the monitoring system onboard the aircraft to a particular destination via the client device and the ad hoc wireless network (tasks 314, 316). In this regard, in some embodiments, the raw measurement data may be required to be manually reviewed by a particular individual (e.g., a HUMS manager, a fleet or maintenance manager, or the like) or at the ground-based station 140 before operation of the rotorcraft 102 can be resumed. In this regard, the user of the client device 120 may manipulate one or more selectable GUI elements 620, 630 to request the raw measurement data from the monitoring system 104 and transmit the raw measurement data to the appropriate destination (e.g., the server 130 or the ground-based station 140). Thereafter, in response to receiving indication that continued operation of the vehicle is authorized, the data communications process 300 displays or otherwise provides a graphical notification on the client device that indicates continued operation of the vehicle may be resumed (task 320).

Figure 8:
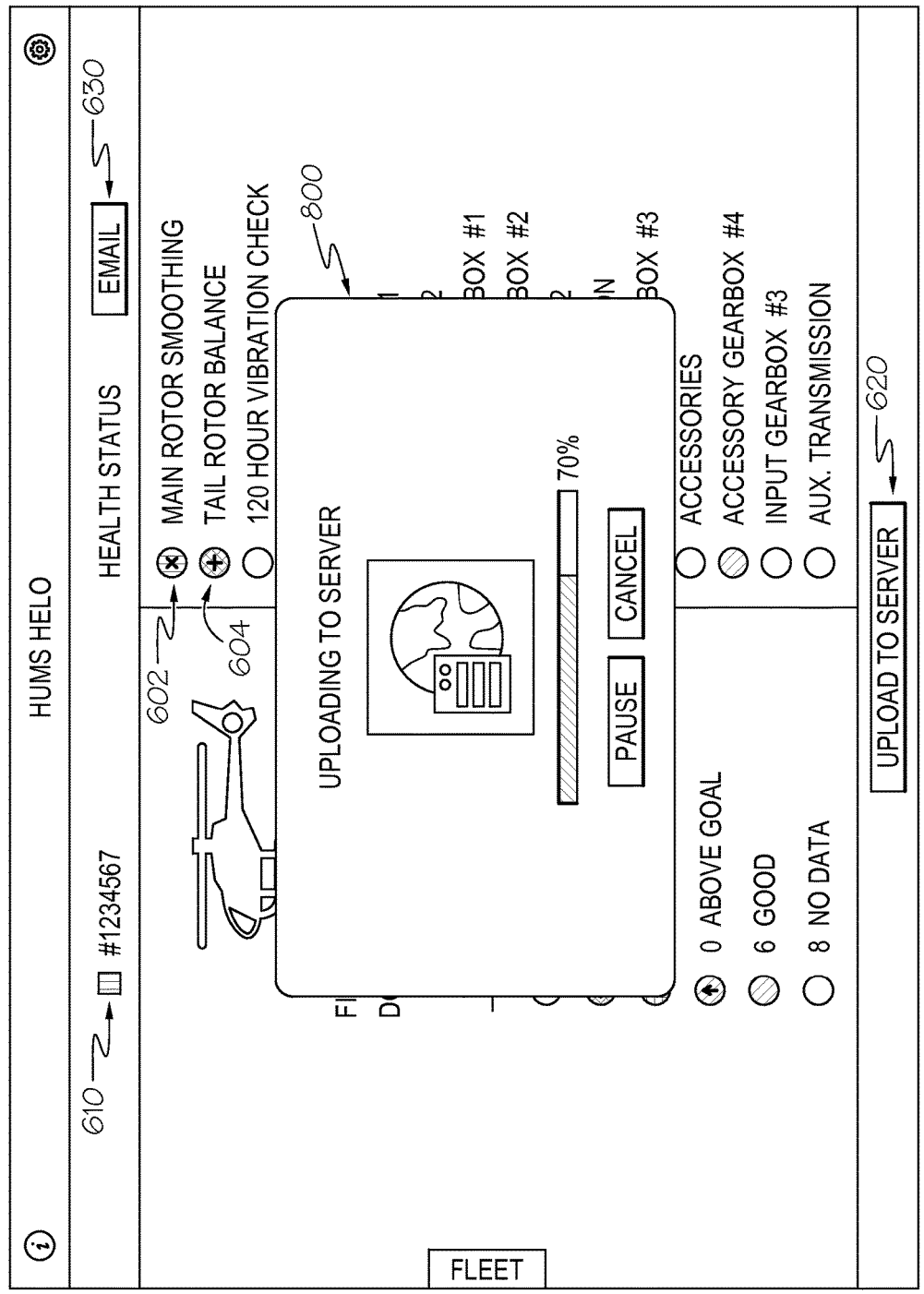
Figure 9:
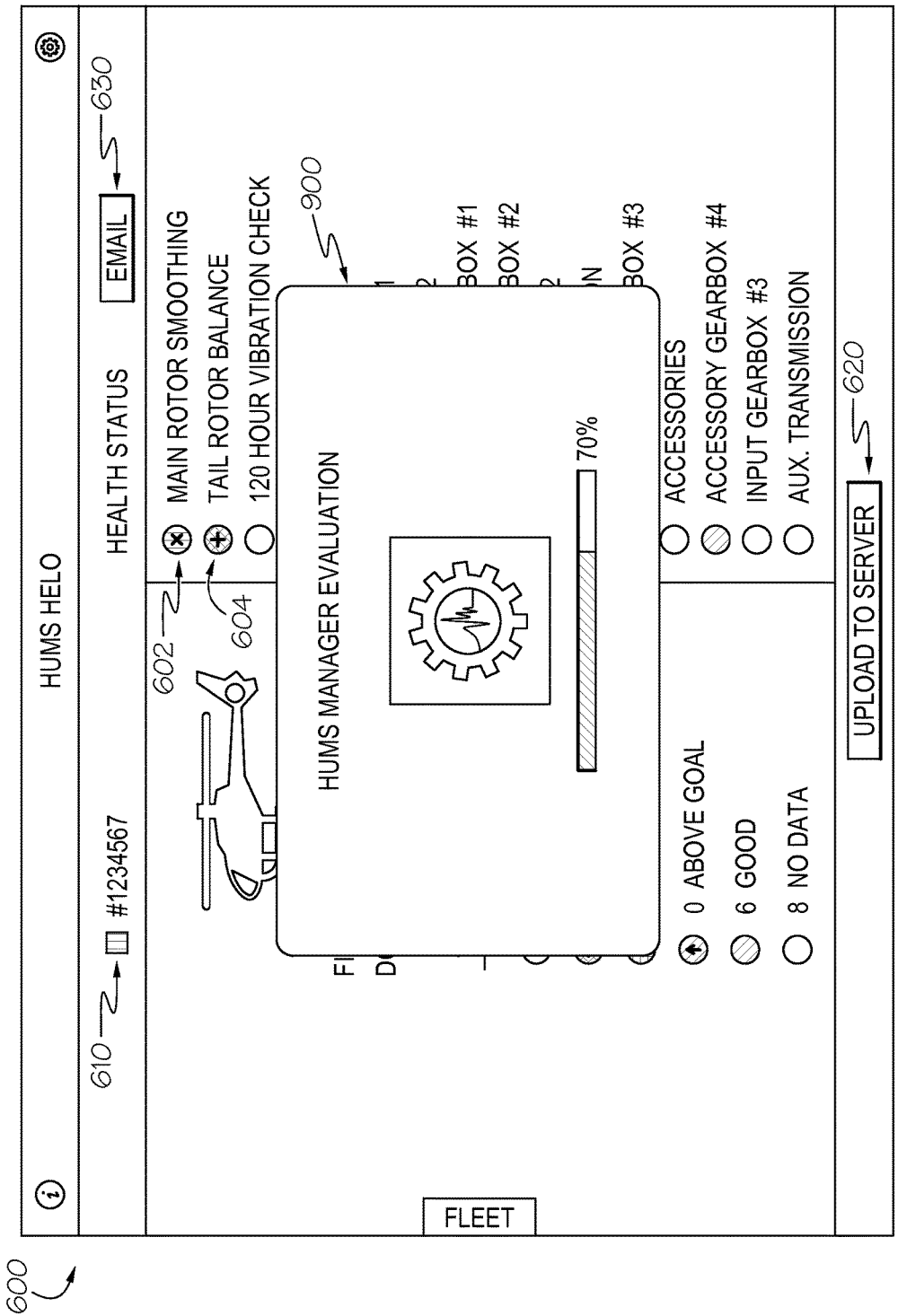
Figure 10:
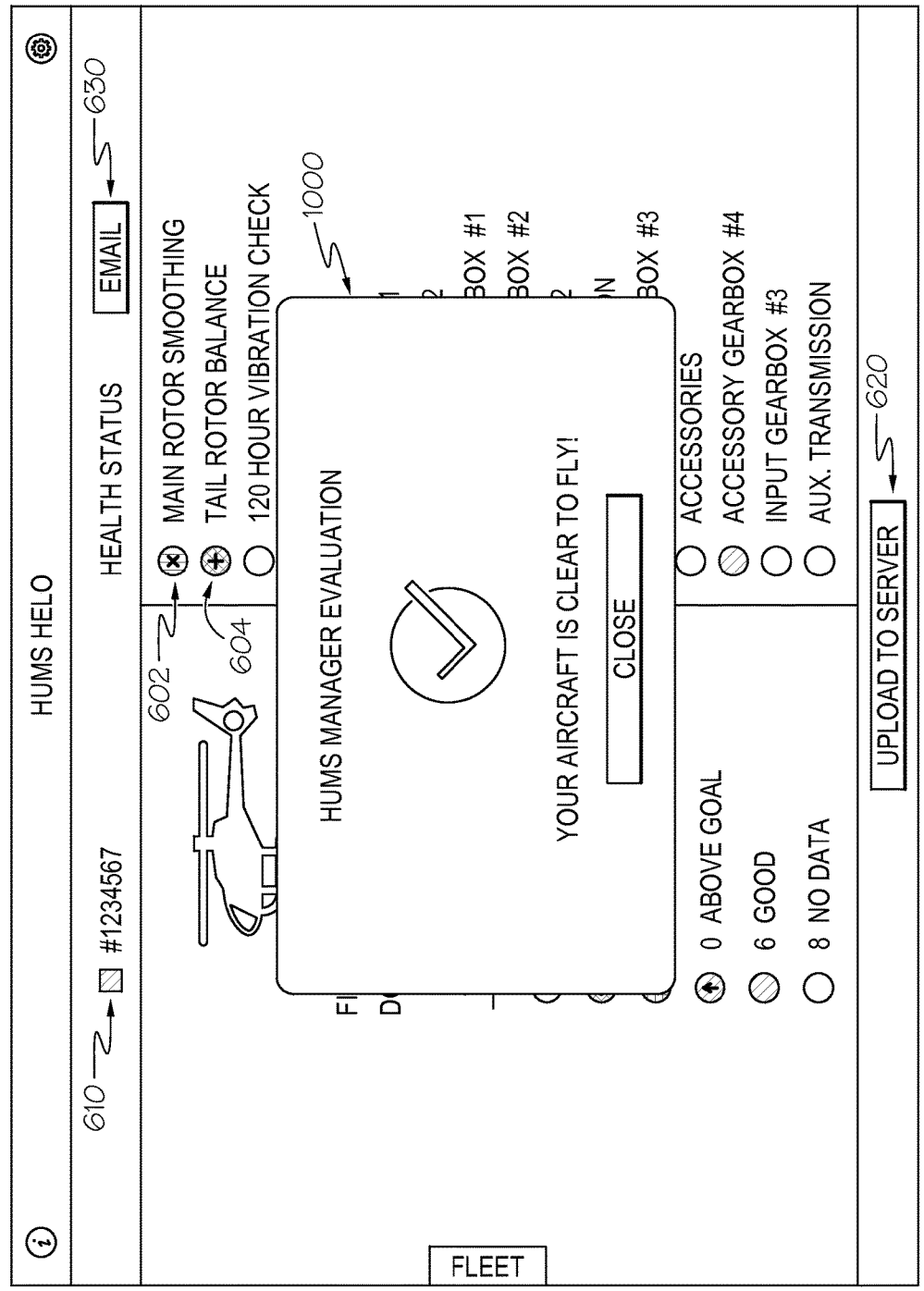

For example, referring now to FIGS. 7-10, the user of the client device 120 may select the GUI element 630 to indicate a desire to communicate the flight measurement data to a particular individual for review and clearance of the rotorcraft 102. In response to selection of the GUI element 630, the client application 122 generates or otherwise provides a GUI element 700 (e.g., a menu, list box, or the like) that includes selectable GUI elements adapted to allow the user to select or otherwise indicate the individual to whom the user would like to notify of the flight measurement data. After selecting the desired individual(s), the user may select the GUI element 620 to initiate transmission of the flight measurement data to the server 130. In response to selection of the GUI element 620, the client application 122 may generate or otherwise provide a request for the flight log data corresponding to the currently displayed status summary file to the monitoring system 104 via the ad hoc point-to-point wireless connection 150. In response to receiving the request, the monitoring system 104 obtains the flight log data from the data storage element 108 and uploads, transmits, or otherwise communicates the flight log data to the client device 120 via the communications interface 114 and the ad hoc point-to-point wireless connection 150. In response, the client application 122 uploads, transmits, or otherwise communicates the flight log data to the server 130 via another communications network 116, such as, for example, a commercial cellular network. As illustrated in FIG. 8, the client application 122 may generate or otherwise provide a GUI element 800 (e.g., a text box or the like) that includes a progress bar that indicates the progress of the transfer of the flight log data to the server 130.

As described in greater detail below, the server 130 may store or otherwise maintain the flight log data in the database 132 and then transmit or otherwise provide a notification (e.g., an email message, a text message, or pushed notification message) to the intended recipient identified by the user of the client device 120. After receiving the flight log data and notifying the intended recipient, the server 130 may transmit or otherwise provide an acknowledgment to the client application 122 via the network 116, and in response, the client application 122 may automatically update the display on the client device 120 to indicate that the review of the flight measurement data is still pending. For example, the client application 122 may generate or otherwise provide a GUI element 900 (e.g., a text box or the like) that includes a progress bar that indicates the amount of the flight measurement data that has been reviewed by the intended recipient designated by the user. In response to the acknowledgment, the client application 122 may also transmit an acknowledgement or notification to the monitoring system 104 to mark the flight log data as being successfully received by or uploaded to the server 130.

In response to receiving the notification of the new flight measurement data (either indirectly from the server 130 or directly from the client device 120), the intended recipient may manipulate or otherwise operate the monitoring application 142 on a ground-based station 140 to retrieve or otherwise obtain the flight measurement data from the server 130 (or database 132). The monitoring application 142 on the ground-based station 140 generates or otherwise provides graphical representations of the raw measurement data corresponding to the status summary data that was presented on the client device 120 in a manner that allows a user of the ground-based station 140 to perform a more detailed analysis of the operational characteristics or conditions of the mechanical components of the rotorcraft 102. After the user at the ground-based station 140 has reviewed the raw flight measurement data and determined that the rotorcraft 102 is cleared or authorized for continued operation, the user may manipulate the monitoring application 142 to transmit or otherwise provide an indication of the clearance to the server 130 (e.g., via network 116), which, in turn, transmits or otherwise provides an indication to the client application 122 that the rotorcraft 102 is authorized for continued operation. In response to receiving the indication, the client application 122 may generate or otherwise provide a graphical notification 1000 (e.g., a text box or the like) on the client device that the rotorcraft 102 has been cleared for flight. Additionally, the client application 122 may update the vehicle indicator 610 to indicate the clearance (e.g., by changing the color of the indicator 610 from red to green).

Referring again to FIG. 3, in one or more embodiments, the data communications process 300 identifies or otherwise determines whether uploading of all of the previously untransmitted or un-uploaded flight measurement data is requested or otherwise desired (task 322). For example, the client application 122 may implement a timer or another similar feature configured such that the client application 122 periodically prompts the user of the client device 120 (e.g., once every 24 hours) for an indication of whether or not the user would like to utilize the client device 120 to transfer any new or otherwise un-uploaded flight measurement data from the monitoring system 104 to the server 130. In response to receiving an indication that the user would like to upload any previously un-uploaded flight measurement data to the server 130, the client application 122 generates or otherwise provides a request for any unmarked flight log data to the monitoring system 104 via the ad hoc point-to-point wireless connection 150. In response to the request, the monitoring system 104 accesses the data storage element 108 to obtain any flight log data that has not been marked as being successfully uploaded to or received by the server 130, and then transmits, communicates, or otherwise provides those instances of flight log data to the client device 120 via the point-to-point wireless connection 150. The client application 122 uploads, transmits, or otherwise communicates the received instances of flight log data to the server 130 via another communications network 116 in a similar manner as described above. After receiving the flight log data, the server 130 may transmit or otherwise provide an acknowledgment to the client application 122 via the network 116, and in response, the client application 122 may transmit or otherwise provide the acknowledgment to the monitoring system 104. In response to the acknowledgment, the monitoring system 104 updates the data storage element 108 such that any previously unmarked instances of flight log data are marked as having been successfully uploaded to or received by the server 130.

It should be noted that in some embodiments, the data communications process 300 may upload any new or unmarked flight log data structure(s) to the server 130 in conjunction with uploading the flight log data corresponding to the status data currently presented on the client device 120. For example, when the user selects or otherwise indicates a desire to upload the flight log data corresponding to the currently displayed status information, the user may also select or otherwise indicate a desire to upload any other flight log data that has not previously been uploaded to the server 130. After the data communications process 300 is completed, operation of the rotorcraft 102 may be resumed. In this regard, it will be appreciated that the data communications process 300 may reduce the amount of time a healthy aircraft is on the ground by allowing the status information to be received and displayed on any portable electronic device 120 having the appropriate application 122 downloaded or installed thereon. Additionally, when the flight measurement data for the aircraft requires attention, the flight measurement data may be retrieved from the onboard monitoring system 104 and made available in a manner that allows it to be readily reviewed by the appropriate personnel at the ground-based station 140 or using another suitable electronic device. In this regard, by pushing a notification to the appropriate personnel, the delay in he or she reviewing the flight measurement data may be further reduced, thereby reducing the amount of time that an airworthy aircraft is on the ground.

Figure 11:
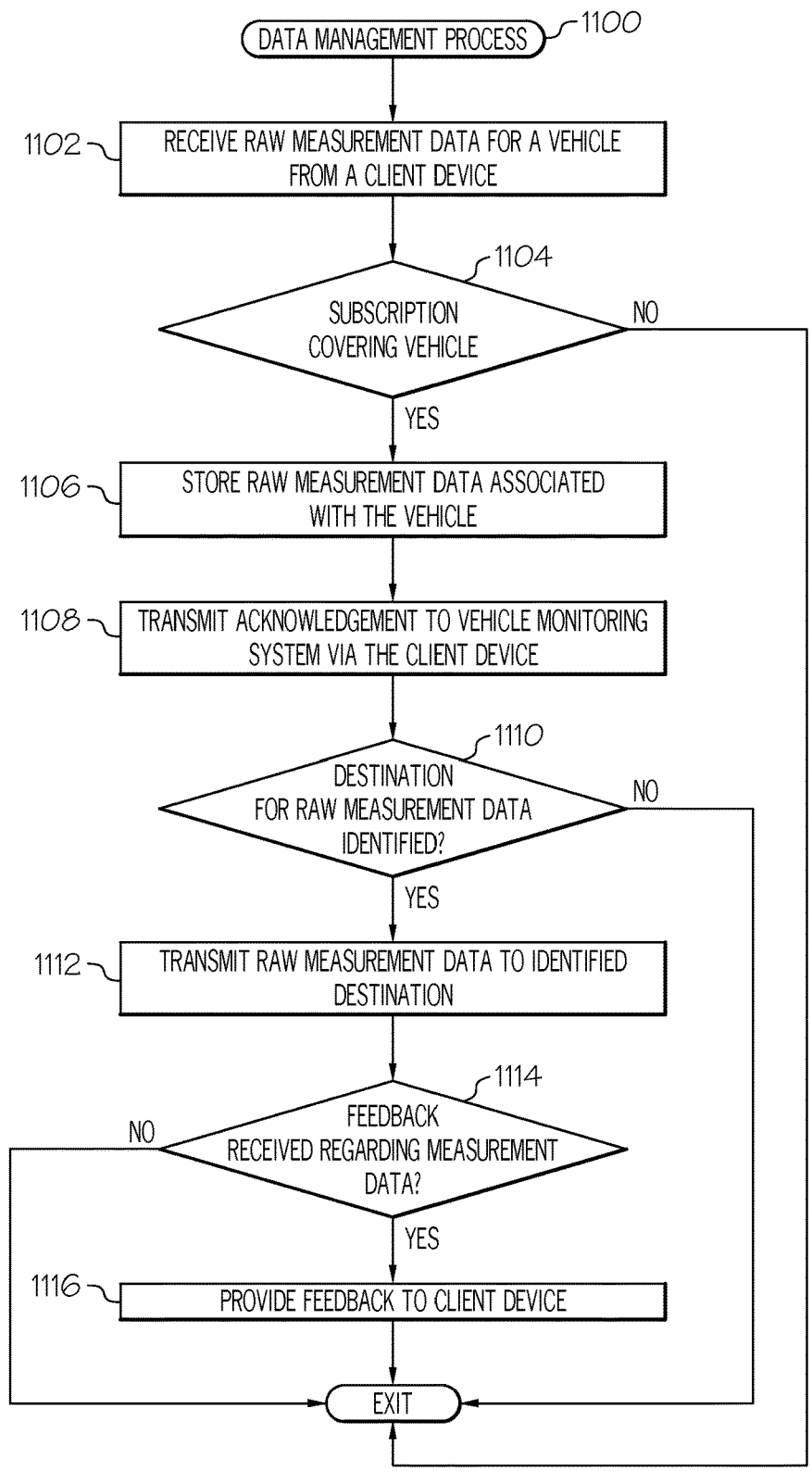
FIG. 11 is a flow diagram of an exemplary data management process suitable for implementation by a destination device, such as the server in the system of FIG. 1, in conjunction with the data communications process of FIG. 3 in accordance with one or more embodiments.

FIG. 11 depicts an exemplary embodiment of a monitoring data management process 1100 suitable for implementation by a destination electronic device, such as the server 130 in the vehicle health management system 100 of FIG. 1. The various tasks performed in connection with the illustrated process 1100 may be implemented using hardware, firmware, software executed by processing circuitry, or any combination thereof. For illustrative purposes, the following description may refer to elements mentioned above in connection with FIG. 1. In practice, portions of the data management process 1100 may be performed by different elements of the vehicle health management system 100, such as, for example, the server 130, the database 132, the ground-based station 140, the monitoring application 142 and/or the network 116. It should be appreciated that the data management process 1100 may include any number of additional or alternative tasks, the tasks need not be performed in the illustrated order and/or the tasks may be performed concurrently, and/or the data management process 1100 may be incorporated into a more comprehensive procedure or process having additional functionality not described in detail herein. Moreover, one or more of the tasks shown and described in the context of FIG. 11 could be omitted from a practical embodiment of the data management process 1100 as long as the intended overall functionality remains intact.

The illustrated data management process 1100 begins by receiving or otherwise obtaining raw measurement data associated with operation of a particular vehicle from a monitoring system onboard the vehicle via an intermediate client device over a communications network (task 1102). In this regard, as described above, the server 130 receives raw flight measurement data for the rotorcraft 102 from the onboard monitoring system 104 via the client device 120 (or client application 122) downloading one or more flight log data structures containing the raw flight measurement data and then retransmitting or re-uploading the flight log data structure(s) to the server 130 via the network 116. In the illustrated embodiment, the data management process 1100 continues by identifying or otherwise determining whether the vehicle associated with the received raw measurement data is authorized or otherwise allowed access to the features or services provided by the data management process 1100 (task 1104). For example, the server 130 may provide data management features or functionality in accordance with a subscription-based model or service, such that the raw measurement data may be stored or processed by the server 130 only for vehicles that are associated with a particular organization or user having a subscription established with a provider of the monitoring system 104 or the server 130. Thus, if the rotorcraft 102 is not covered by a preexisting subscription established with the server 130, the server 130 may discard the received flight measurement data or otherwise exit the data management process 1100.

When the received raw measurement data is associated with a vehicle that is covered by a valid subscription, the data management process 1100 continues by storing or otherwise maintaining the raw measurement data in a persistent manner and transmitting or otherwise providing an acknowledgment to the monitoring system onboard the vehicle that the raw measurement data has been received (tasks 1106, 1108). For example, the server 130 may update the database 132 to store the received flight log data structure(s) associated with the rotorcraft 102 or monitoring system 104. In this regard, the database 132 stores a received flight log data structure in a manner that maintains an association between the flight log data structure (or the raw flight measurement data contained therein) and one or more of the rotorcraft 102, the monitoring system 104, and the subscription associated with the rotorcraft 102 or the monitoring system 104 (e.g., by associating a flight log data structure with an identifier for the organization or user that owns or operates the rotorcraft 102). After successfully receiving and storing a received flight log data structure, the server 130 may transmit or otherwise provide, via the network 116, an acknowledgment message to the client application 122 on the client device 120, which, in turn, transmits or otherwise provides the acknowledgment message to the onboard monitoring system 104 via the ad hoc wireless network connection. As described above, in response to the acknowledgment message, the monitoring system 104 may mark the corresponding flight log data structure(s) as having been received by the server 130, such that they are not redundantly uploaded to the server 130 and may be subsequently deleted as desired without the flight measurement data being irretrievably lost.

In the illustrated embodiment, the data management process 1100 continues by identifying or otherwise determining whether an intended destination or intended recipient for the raw measurement data is identified, and if so, transmitting or otherwise providing the raw measurement data to the intended destination or recipient (tasks 1110, 1112). For example, if the user of the client device 120 has manipulated the client application 122 to identify an intended email recipient for the flight measurement data, the server 130 may automatically generate or otherwise create an email message having the flight log data attached and automatically send the created email message with the attached flight log data to the intended recipient. In other embodiments, the server 130 may automatically generate a notification indicating the availability of the flight measurement data in the desired format (e.g., email message, text message, or the like) and transmit or otherwise provide the notification to the intended recipient. Thereafter, in response to receiving, via the network 116, a request from the intended recipient to view or otherwise access the flight measurement data, the server 130 may automatically retrieve or otherwise obtain the flight measurement data (or the corresponding flight log data) and transmit the flight measurement data to the requesting electronic device via the network 116. For example, the server 130 may push a notification to an intended recipient identified by the user of the client device 120. In response to the intended recipient receiving the notification (e.g., on his or her own instance of a client device 120), the intended recipient may operate the ground-based station 140 to execute the monitoring application 142 and manipulate the monitoring application 142 to request the flight measurement data identified in the notification from the server 130. In response to the request, the server 130 may then automatically provide the flight measurement data (or the flight log data) to the monitoring application 142 via the network 116 for processing and presentation by the monitoring application 142.

Still referring to FIG. 11, the illustrated data management process 1100 continues by identifying or otherwise determining whether any feedback regarding the flight measurement data has been received, and in response to receiving feedback, automatically transmitting or otherwise providing the feedback to the client device (tasks 1114, 1116). For example, as described above, the user at the ground-based station 140 may be required to manually review the flight measurement data and assess the airworthiness of the rotorcraft 102 and authorize continued operation of the rotorcraft 102 before the rotorcraft 102 can resume flying. After reviewing the flight measurement data in the monitoring application 142, the user may manipulate the monitoring application 142 to indicate that the rotorcraft 102 is authorized to resume operations and transmit or otherwise provide the indication to the server 130. In response to receiving an indication of the continued airworthiness, the server 130 may transmit or otherwise provide the indication (or a corresponding message) to the client application 122 for presentation on the client device 120 that indicates that the rotorcraft 102 is cleared to continue flying. Additionally, in some embodiments, the server 130 may also update the flight log data in the database 132 to indicate that the flight measurement data was reviewed, along with information indicating the airworthiness determination, the user associated with the determination, the date or time of the determination, and/or other metadata as appropriate.

Figure 12:
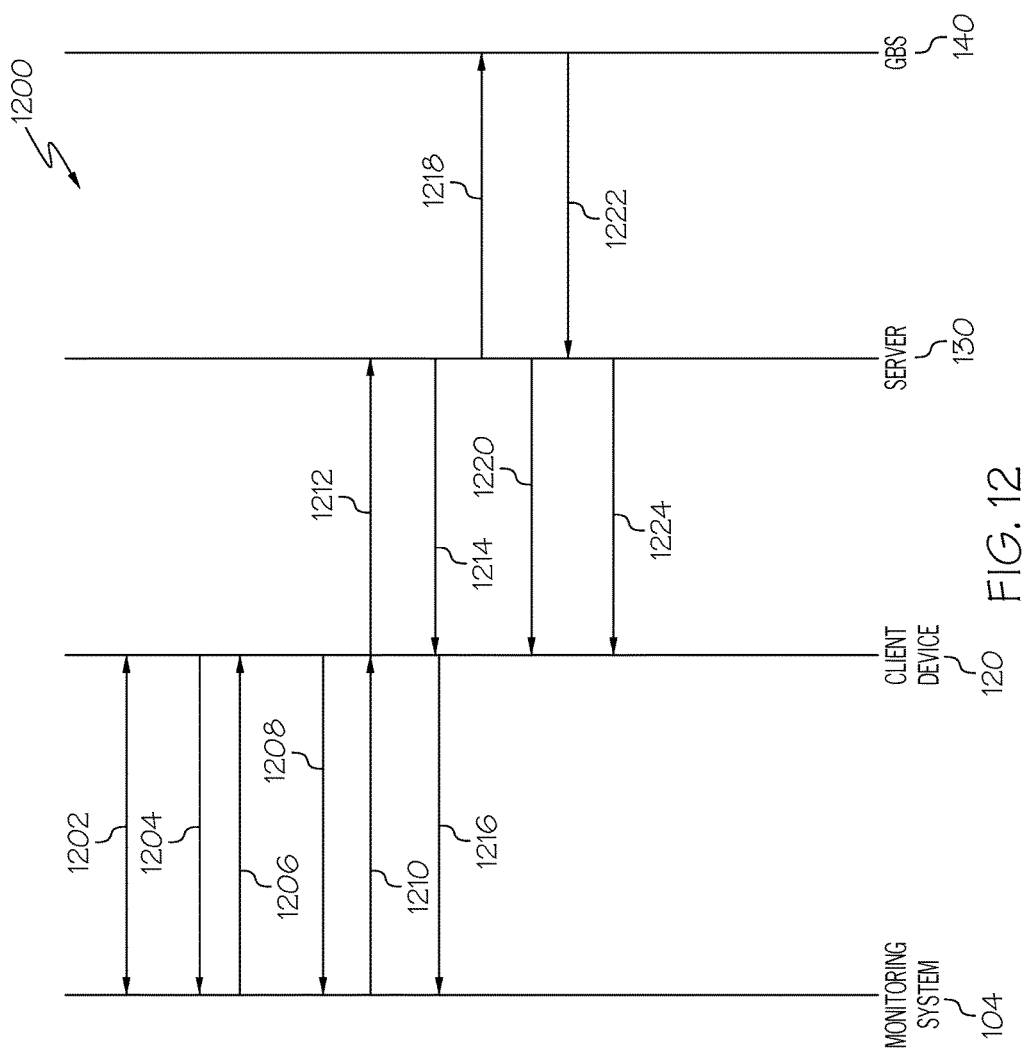
FIG. 12 depicts an exemplary sequence of communications within the system of FIG. 1 in accordance with an exemplary embodiment of the data communications process of FIG. 3 in conjunction with the monitoring process of FIG. 2 and the data management process of FIG. 11.

FIG. 12 depicts an exemplary sequence 1200 of communications within the vehicle health management system 100 of FIG. 1 in accordance with an exemplary embodiment of the data communications process 300 of FIG. 3 in conjunction with the monitoring process 200 of FIG. 2 and the data management process 1100 of FIG. 11. Prior to the sequence 1200 beginning, the rotorcraft 102 is flown or otherwise operated for a period of time during which measurement data pertaining to operational characteristics of the mechanical components of the drive assembly 112 and the rotor assembly 110 is obtained by the onboard monitoring system 104 via the onboard sensor systems 106. Thereafter, when the rotorcraft 102 is on the ground, a user associated with the client device 120 may access the rotorcraft 102 and enable the communications interface 114 coupled to the monitoring system 104, for example, by inserting the communications interface 114 into the port 105 of the monitoring system 104. In response, the monitoring system 104 automatically establishes an ad hoc wireless network with an SSID corresponding to the tail number or other unique identifier associated with the rotorcraft 102.

Referring to FIG. 12, with continued reference to FIGS. 1-11, as described above, the user manipulates the client device 120 to execute the client application 122 and manipulates the client application 122 to select the wireless network associated with the rotorcraft 102 from a list of vehicle wireless networks detected within range of the client device 120 (e.g., by selecting GUI element 404). In response to receiving selection of rotorcraft 102, the client application 122 automatically initiates or otherwise establishes 1202 a point-to-point connection with the monitoring system 104 via the ad hoc wireless network. After establishing a point-to-point ad hoc wireless connection 150 with the monitoring system 104, the user manipulates the client application 122 to request 1204 status information for the mechanical components of the rotorcraft 102 from the monitoring system 104 (e.g., by selecting button 502). The monitoring system 104 receives the request via the ad hoc point-to-point wireless connection 150, and in response, automatically transmits or otherwise provides 1206 the status summary file corresponding to the most recent flight of the rotorcraft 102 from the data storage element 108 to the client application 122 via the ad hoc point-to-point wireless connection 150. The client application 122 opens, displays, or otherwise executes the status summary file to generate or otherwise present a vehicle status display (e.g., GUI display 600) that includes graphical representations indicative of the health or condition of the mechanical components of the rotorcraft 102.

When the health or condition of one or more of the mechanical components requires manual review or inspection by another user, the user manipulates the client application 122 to request 1208 the raw flight measurement data corresponding to the currently presented vehicle status display from the monitoring system 104 (e.g., by selecting one or more buttons 620, 630). The monitoring system 104 receives the request via the ad hoc point-to-point wireless connection 150, and in response, automatically transmits or otherwise provides 1210 the flight log data that includes the raw flight measurement data obtained during the most recent flight of the rotorcraft 102 from the data storage element 108 to the client application 122 via the ad hoc point-to-point wireless connection 150. The client application 122 automatically uploads, transmits, or otherwise provides 1212 the flight log data to the server 130 via another network 116 that is separate or otherwise distinct from the ad hoc vehicle wireless network.

After verifying that a valid subscription covering the rotorcraft 102 exists, the server 130 stores or otherwise maintains the flight log data in the database 132 and transmits or otherwise provides 1214 an acknowledgment that the flight log data was successfully uploaded to the client application 122 via the network 116. The client application 122 transmits or otherwise provides 1216 the acknowledgment to the monitoring system 104 via the ad hoc point-to-point wireless connection 150. In response to receiving the acknowledgment, the monitoring system 104 may automatically update the flight log data corresponding to the most recent flight of the rotorcraft 102 as having been successfully uploaded or received by the server 130.

As described above, the server 130 may automatically transmit or otherwise provide 1218 the flight log data to the ground-based station 140 or another a destination device associated with the user who is responsible for manually reviewing or inspecting the flight measurement data. In alternatively embodiments, the client application 122 and/or the server 130 may transmit or otherwise provide a notification to the intended recipient of the flight measurement data that indicates the flight measurement data is available for review from the server 130. In response to the notification, the intended recipient may manipulate the ground-based station 140 to execute the monitoring application 142 and request or otherwise access the flight log data from the server 130. After providing 1218 the flight log data to the ground-based station 140, the server 130 may transmit or otherwise provide 1220 progress information to the client application 122, which, in turn, generates or otherwise provides, on the client device 120, a graphical indication of the current status of the review on the ground-based station 140 (e.g., GUI element 900).

After reviewing the flight measurement data, the user at the ground-based station 140 may manipulate the monitoring application 142 to transmit or otherwise provide 1222 feedback regarding the airworthiness of the rotorcraft 102 to the server 130. The server 130 transmits or otherwise provides 1224 the feedback to the client application 122, which, in turn, updates the vehicle status display on the client device 120 in a manner that is influenced by the feedback. For example, if the initial vehicle status display indicated that the rotorcraft 102 may not be cleared for further operation without additional maintenance and the feedback indicates clearance for continued operation without maintenance, the client application 122 may update the vehicle status display to indicate that the rotorcraft 102 is cleared to continue operating (e.g., by displaying GUI element 1000). Additionally, if a graphical indicator for one or more mechanical components of the drive assembly 112 or rotor assembly 110 indicated a potential need for maintenance, the client application 122 may update the graphical indicator(s) to indicate that a need for maintenance does not exist (e.g., by changing the color or another characteristic of the indicator). Once the aircraft is cleared for continued operation, the user associated with the client device 120 may remove the communications interface 114 from the port 105 of the monitoring system 104 and allow the rotorcraft 102 to be flown again without any further delay.

Figure 13:
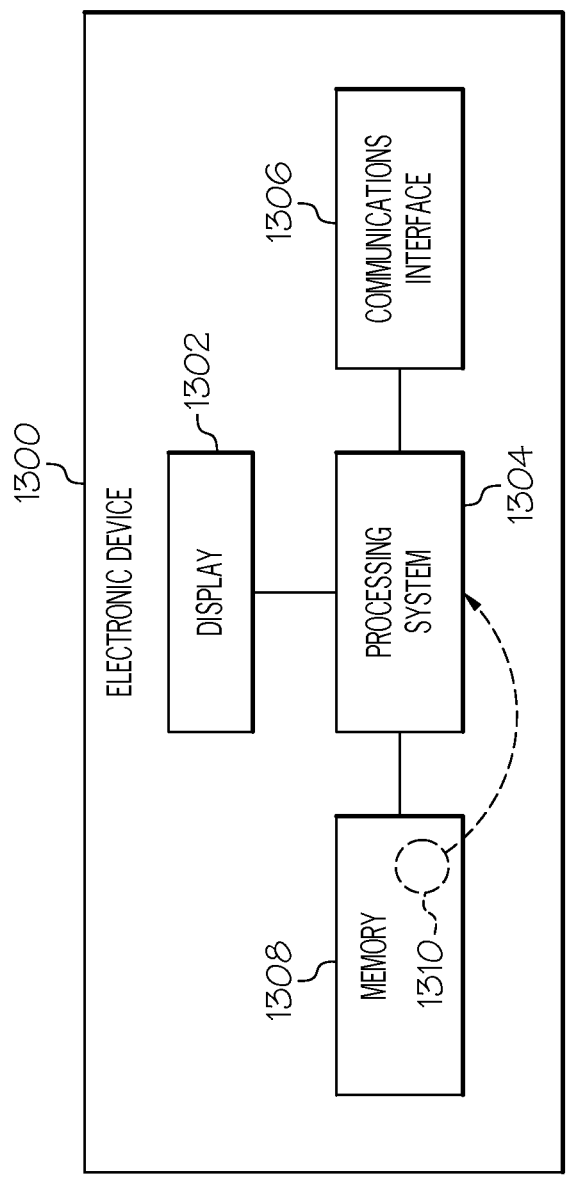
FIG. 13 depicts an exemplary electronic device suitable for use in the system of FIG. 1 in accordance with one or more embodiments.

FIG. 13 depicts an exemplary embodiment of an electronic device 1300 suitable for use as one or more of the devices 104, 120, 130, 140 in the vehicle health management system 100 of FIG. 1. In this regard, one or more of the devices 104, 120, 130, 140 may be realized as a separate instance of the device 1300. For example, depending on the embodiment, the electronic device 1300 may be realized as a mobile telephone, a laptop or notebook computer, a tablet computer, a personal digital assistant, or the like suitable for use as the client device 120. In yet other embodiments, the electronic device 1300 may be realized as a desktop computer or workstation utilized for the ground-based station 140, or a server computer or server computing system utilized for the server 130. In the illustrated embodiment, the device 1300 includes or otherwise executes an application 1310 (e.g., client application 122, monitoring application 142, or the like) configured to support the processes or operations described above in the context of FIGS. 1-12.

As illustrated in FIG. 13, the device 1300 includes a processing system 1304 that is coupled to the display device 1302 and a communications interface 1306, wherein the processing system 1304 is configured to execute or otherwise support the application 1310 and the additional processes, tasks, functions, and/or operations described herein. The display device 1302 generally represents the component, hardware or the like of the electronic device 1300 that is capable of displaying, rendering, or otherwise presenting graphical representations of status information or corresponding measurement data that is received by or otherwise stored on the electronic device 1300. In this regard, the display device 1302 may be realized as a monitor, screen, or another conventional electronic display device capable of graphically presenting content or imagery.

The processing system 1304 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. In exemplary embodiments, the electronic device 1300 includes a data storage element (or memory) 1308 that is coupled to or otherwise accessed by the processing system 1304. The memory 1308 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the processing system 1304. The stored programming instructions, when read and executed by the processing system 1304, cause processing system 1304 to create, generate, or otherwise facilitate the application 1310.

The communications interface 1306 generally represents the component, hardware or the like of the electronic device 1300 that facilitates communications with one or more other devices within the vehicle health management system 100. For example, the communications interface 1306 may be realized as a wireless adapter, a wireless transceiver, a wireless network interface controller, a Bluetooth transceiver, a cellular transceiver, a wired network interface controller (e.g., Ethernet), or the like. Although FIG. 13 depicts the communications interface 1306 as being part of the device 1300, in some embodiments, the communications interface 1306 may be separate from or otherwise external to the device 1300 and communicatively coupled to the processing system 1304 by being detachably inserted into a port of the device 1300 (e.g., port 105).

Referring again to FIGS. 1-12, to briefly summarize, the subject matter described herein allows for the current health status of a vehicle to be expeditiously reviewed in a manner that does not require a dedicated communications infrastructure or a specialized device. Thus, if the vehicle is healthy and cleared for continued operation, the amount of time during which the vehicle is out of operation may be reduced. Conversely, if the current condition of the vehicle requires further review, the raw measurement data corresponding to the operational characteristics of the mechanical components of the vehicle may be transferred from the monitoring system to a desired user or desired destination device using the intermediary client device and whatever communications network is available to the client device. Once the measurement data is reviewed, the feedback may be provided back to the client device in an expeditious manner, thereby allowing the vehicle to resume operation with minimal delay once cleared for continued operation.

For the sake of brevity, conventional techniques related to rotor track and balance, health and usage monitoring, onboard sensor systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting information pertaining to a plurality of mechanical components of a rotorcraft including at least one of a rotor assembly and a drive assembly, the method comprising:
    initiating, by a client device, an ad hoc wireless connection with a monitoring system onboard the rotorcraft via a wireless network associated with the rotorcraft, wherein the monitoring system onboard the rotorcraft analyzes measurement data obtained during operation of the rotorcraft corresponding to operational characteristics of one or more of the plurality of mechanical components of the rotorcraft and generates a status summary file including status summary data indicative of a health of each respective mechanical component of the plurality of mechanical components based at least in part on the measurement data, the measurement data corresponding to operational characteristics of the one or more mechanical components of the at least one of the rotor assembly and the drive assembly during flight;
    requesting, by the client device via the ad hoc wireless connection, the status summary file from the monitoring system;
    receiving, by the client device, the status summary file from the monitoring system via the ad hoc wireless connection, the monitoring system providing the status summary file in response to the client device requesting the status summary file;
    processing, by the client device, the status summary data of the status summary file to present graphical representations of the health of each respective mechanical component of the at least one of the rotor assembly and the drive assembly of the rotorcraft on the client device; and
    providing, on the client device, an indication the rotorcraft is cleared for further operation when the status summary data indicates the plurality of mechanical components are healthy.

2. The method of claim 1, further comprising:
    detecting the ad hoc wireless network associated with the rotorcraft;
    displaying, on the client device, a list of vehicle networks, the list including the ad hoc wireless network associated with the rotorcraft; and
    receiving, at the client device, a user input indicative of selection of the ad hoc wireless network associated with the rotorcraft from the list, wherein:
        initiating the ad hoc wireless connection with the monitoring system onboard the rotorcraft comprises the client device initiating a point-to-point connection over the ad hoc wireless network associated with the rotorcraft.

3. The method of claim 1, further comprising:
    requesting, by the client device via the ad hoc wireless connection, the measurement data from the monitoring system;
    receiving, by the client device from the monitoring system via the ad hoc wireless connection, the measurement data obtained during operation of the rotorcraft, the monitoring system providing the measurement data in response to the client device requesting the measurement data; and
    transmitting the measurement data from the client device to a destination device via a separate communications network.

4. A non-transitory computer-readable medium having instructions stored thereon that are executable by a processing system of the client device to perform the method of claim 1.

5. The method of claim 1, further comprising broadcasting, by the monitoring system, an identifier associated with the wireless network that corresponds to a unique identifier associated with the rotorcraft.

6. A system comprising:
    one or more sensor systems onboard a rotorcraft to obtain measurement data corresponding to operational characteristics of one or more mechanical components of at least one of a rotor assembly and a drive assembly of the rotorcraft during flight;
    a monitoring system onboard the rotorcraft and coupled to the one or more sensor systems to analyze the measurement data obtained during operation of the rotorcraft determine status summary data indicative of a current condition of each of the one or more mechanical components based on the measurement data, create a status summary file including the status data, establish an ad hoc wireless network associated with the rotorcraft using a communications interface, and transmit the status summary file to a client device via an ad hoc wireless connection via the ad hoc wireless network, wherein the status summary data is executable by the client device to present graphical representations of the current condition of each respective mechanical component of the one or more mechanical components of the at least one of the rotor assembly and the drive assembly of the rotorcraft and an indication the rotorcraft is cleared for further operation when the status data indicates the one or more mechanical components are healthy.

7. The system of claim 6, further comprising a data storage element coupled to the monitoring system, the monitoring system creating the status summary file including the status summary data in the data storage element, wherein:
   the client device displays a graphical representation of the status summary file, the graphical representation of the status summary file including the graphical representations of the current conditions of the one or more mechanical components of the rotorcraft.

8. The system of claim 7, wherein:
   the monitoring system creates a flight log data structure including the measurement data in the data storage element; and
   the monitoring system transmits the flight log data structure to the client device via the ad hoc wireless connection in response to receiving a request for the measurement data from the client device.

9. The system of claim 8, wherein the monitoring system marks the flight log data structure in the data storage element as being successfully uploaded in response to receiving an acknowledgment from the client device.

10. The system of claim 6, the monitoring system creating code executable to present the graphical representations of the current conditions of the one or more mechanical components of the rotorcraft, wherein the status summary data comprises the code.

11. The system of claim 6, wherein the monitoring system automatically establishes the ad hoc wireless network associated with the rotorcraft in response to detecting the communications interface plugged in to a port of the monitoring system.

12. The system of claim 6, wherein the monitoring system broadcasts an identifier for the ad hoc wireless network corresponding to a unique identifier associated with the rotorcraft.

13. A system comprising:
   a monitoring system onboard a rotorcraft to obtain measurement data corresponding to operational characteristics of a plurality of mechanical components of the rotorcraft, generate a metric indicative of the health of each respective mechanical component of the plurality of mechanical components based at least in part on the measurement data, determine status summary data indicative of a current condition of each of the plurality of mechanical components by classifying the health of each respective mechanical component based on the metric, generate a status summary file including the status summary data, and establish an ad hoc wireless network associated with the rotorcraft, wherein the rotorcraft includes at least one of a rotor assembly and a drive assembly and the measurement data corresponds to operational characteristics of the one or more mechanical components of the at least one of the rotor assembly and the drive assembly during flight;
   a client device to initiate a connection via the ad hoc wireless network, receive the status summary file from the monitoring system via the connection, display graphical representations indicative of the current condition of each of the plurality of mechanical components based on the status summary data, and display a graphical notification the rotorcraft is cleared for further operation when the status summary data indicates the plurality of mechanical components are healthy, wherein the graphical representations comprise graphical representations of the health of each respective mechanical component of the at least one of the rotor assembly and the drive assembly.

14. The system of claim 13, further comprising a server coupled to the client device via a second communications network separate from the ad hoc wireless network, wherein the client device receives the measurement data from the monitoring system via the connection and uploads the measurement data to the server via the second communications network.

15. The system of claim 14, wherein:
   the ad hoc wireless network comprises a wireless local area network; and
   the second communications network comprises a cellular network.

16. The method of claim 5, wherein the unique identifier comprises a tail number.

17. The system of claim 11, wherein the communications interface comprises a detachable wireless adapter.

* * * * *